United States Patent [19]
Olsen et al.

[11] 3,945,507
[45] Mar. 23, 1976

[54] TIER PATTERN SELECTION AND FORMATION FOR A BALE WAGON

[75] Inventors: James A. Olsen, Fresno; Lee D. Butler, Kingsburg, both of Calif.

[73] Assignee: Sperry Rand Corporation, New Holland, Pa.

[22] Filed: Aug. 19, 1974

[21] Appl. No.: 498,839

[52] U.S. Cl. ................................ 214/6 B; 214/6 P
[51] Int. Cl.² .................................. B65G 57/32
[58] Field of Search ............. 214/6 B, 6 P; 198/235

[56] References Cited
UNITED STATES PATENTS

| | | | |
|---|---|---|---|
| 3,289,859 | 12/1966 | Tarboy | 214/6 B |
| 3,395,814 | 8/1968 | Grey | 214/6 B |
| 3,446,369 | 5/1969 | May et al. | 214/6 B |
| 3,501,025 | 3/1970 | Jay et al. | 214/6 B |
| 3,549,023 | 12/1970 | Backman | 214/6 B |
| 3,599,806 | 8/1971 | Fishcher | 214/6 B |

*Primary Examiner*—Robert J. Spar
*Assistant Examiner*—L. J. Paperner
*Attorney, Agent, or Firm*—John R. Flanagan; Frank A. Seemar; Joseph A. Brown

[57] ABSTRACT

A bale wagon has improved means for facilitating tier pattern selection and formation on a table of the wagon. A plurality of paddles are mounted on the table for sensing bale presence at any of a plurality of locations thereon and, upon sensing a bale, actuating some of a plurality of operable means associated with the table for arranging bales into a plurality of tier patterns on the table. A cam acts upon a plurality of links, being associated therewith and coupled with respective paddles, for selecting which of the paddles will actuate the operable means and in such manner thereby selects which of the tier patterns will be formed. The cam may be moved between different positions for selecting different ones of the paddles.

17 Claims, 54 Drawing Figures

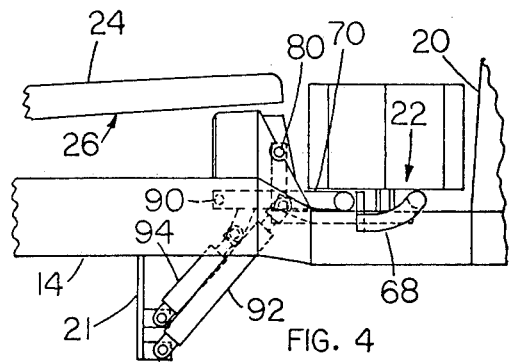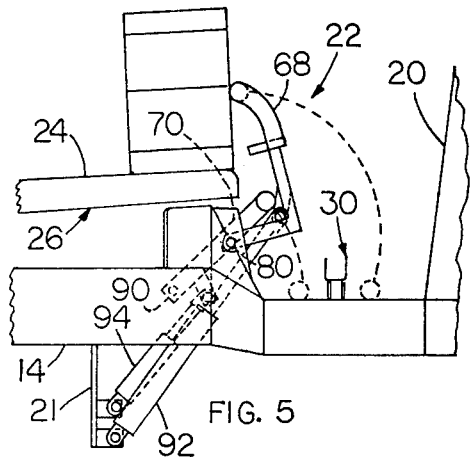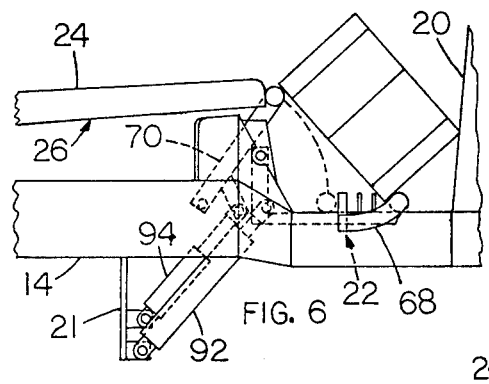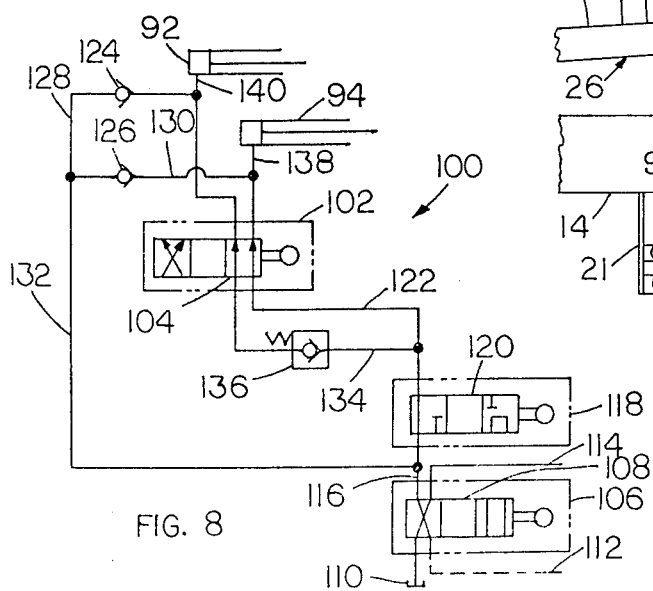

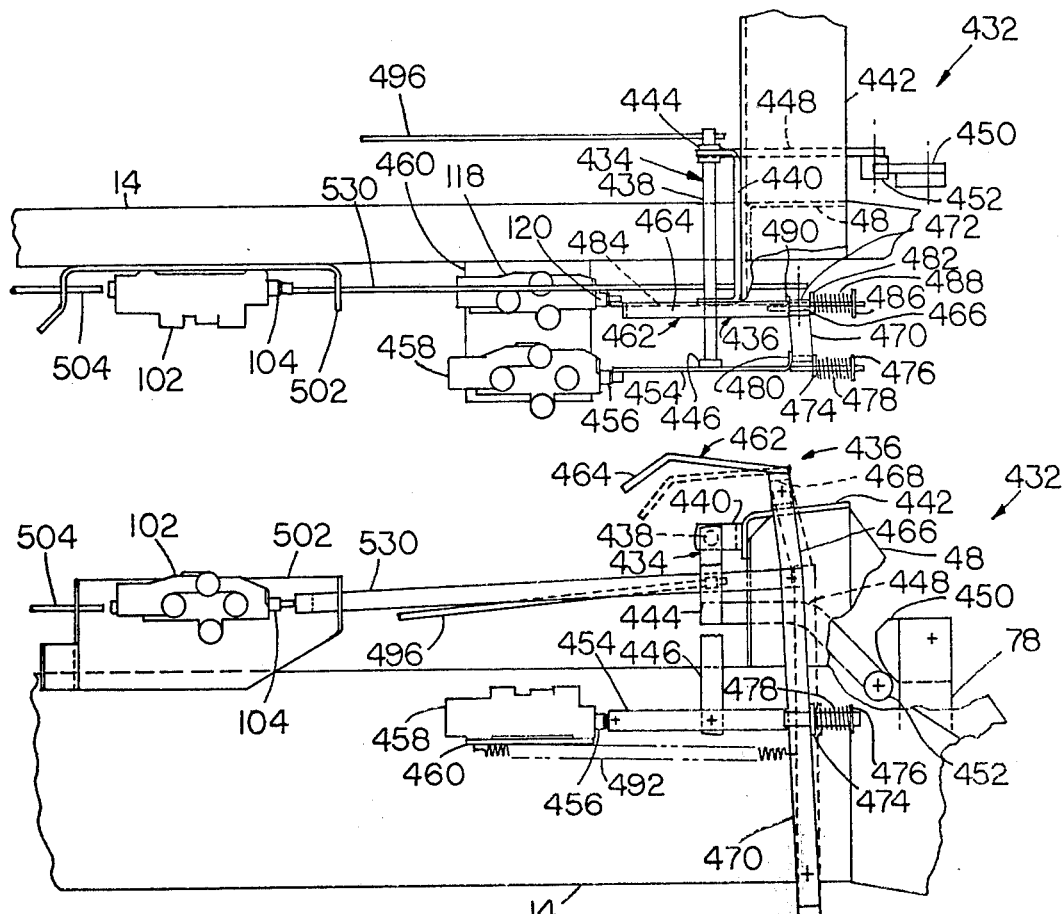
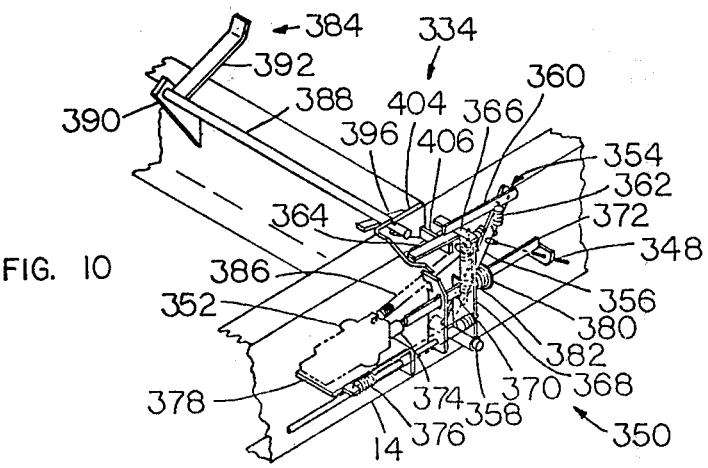

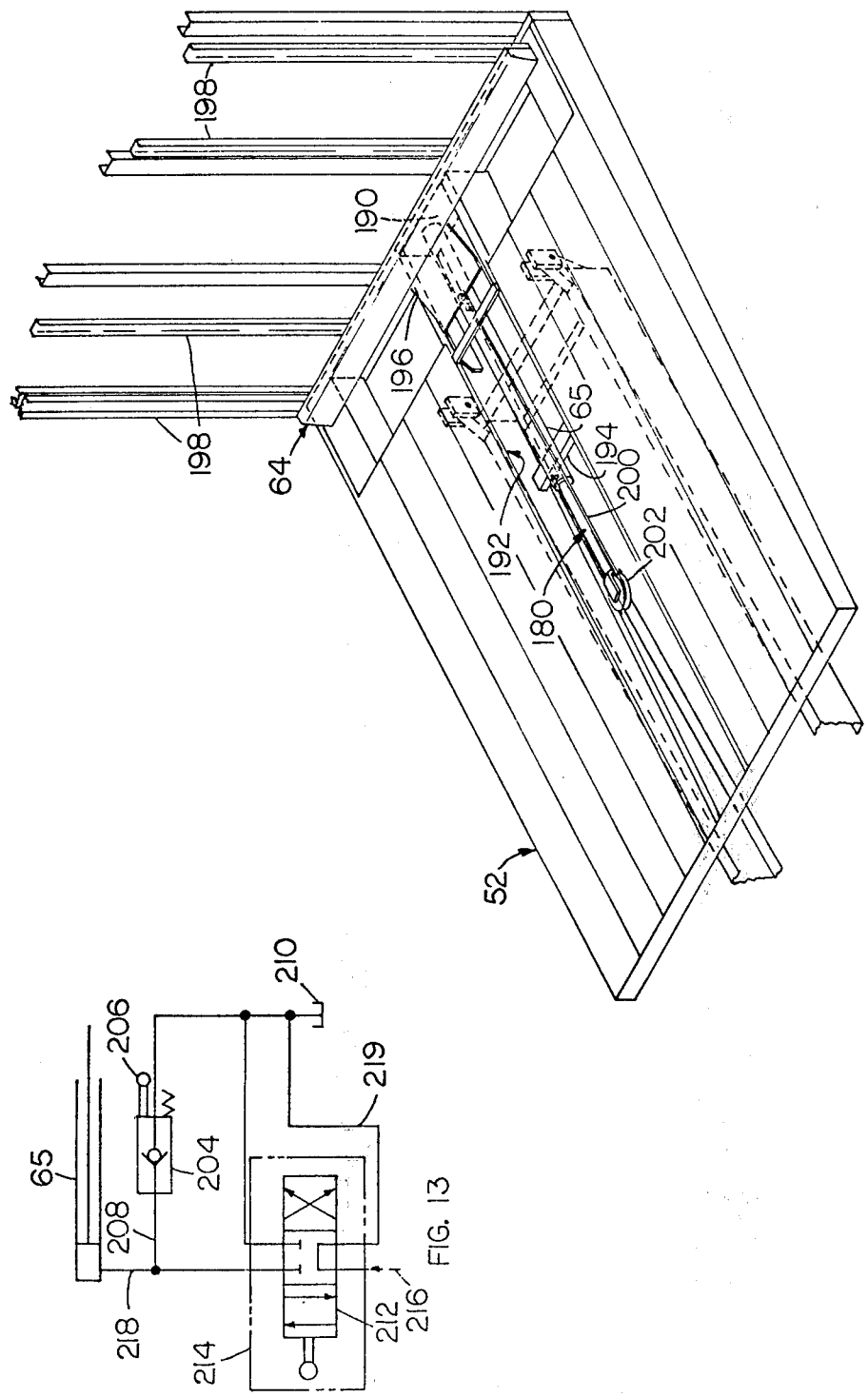

TIER PATTERN SELECTION AND FORMATION FOR A BALE WAGON

CROSS REFERENCES TO RELATED APPLICATIONS

Reference is hereby made to the following co-pending U.S. applications dealing with related subject matter and assigned to the assignee of the present invention:

1. "Improved First Table for a Bale Wagon" by Edward J. Wynn et al. U.S. Ser. No. 408,782, filed Aug. 19, 1974.
2. "Mode of Operation Selection for the First Table of a Bale Wagon" by Lee D. Butler et al, U.S. Ser. No. 498,833, filed Aug. 19, 1974.
3. "Load Position Sensing and Tier Pattern Selection for a Bale Wagon" by Lee D. Butler et al, U.S. Ser. No. 498,834, filed Aug. 19, 1974.

BACKGROUND OF THE INVENTION

1. Field of the Invention

The present invention relates generally to the art of forming a stack of crop material bales and, more particularly, is concerned with a bale wagon incorporating improved features for facilitating the formation of a block-type, tied or interlocked stack of bales thereon.

2. Description of the Prior Art

It is accepted present day practice to form bales of crop material such as hay or the like into stacks through the employment of an automatic bale wagon.

One type of bale wagon which has achieved widespread commercial acceptance is the automatic bale wagon which employs the three table concept, as originally illustrated and described in U.S. Pat. No. 2,848,172 which issued to Gordon E. Grey.

The Grey bale wagon includes a first table which successively receives bales from a bale loader or pickup on the wagon and accumulates a predetermined number of them, for example two, being arranged end-to-end in a row, a second table which successively receives the accumulated rows of bales from the first table and accumulates a plurality thereof, such as 4, 5 or 6 rows, which plurality of rows is commonly called a tier of bales, and a third table or load bed which successively receives the tiers from the second table and accumulates a plurality of the tiers, for example, 7, to form a stack thereon. Once the stack has been accumulated on the load bed, it may be unloaded by pivoting the load bed 90° and depositing the stack on the ground or the like with the first tier of bales which was previously accumulated on the second table now being the lowermost tier of the stack in contact with the ground surface.

Since the stack formed by the bale wagon and deposited on the ground at a storage location may remain there for an extended period of time, it is desirable that the bales forming the lowermost tier be oriented such that a non-twine or-wire bearing side of each bale, commonly referred to as an "edge" of a bale, is in contact with the ground in order to avoid wire rusting or twine rotting which eventually would result in broken bales in the lowermost tier and probable toppling of the stack.

To provide the aforementioned desired orientation of the bales of the lowermost tier of the stack, the operations which have heretofore been performed in picking up and forming bales into each of the tiers of the stack by the bale wagon are as follows. First, bales deposited on one of their edge sides in a field by a baler are picked up by the bale wagon loader and moved through a 90° lateral path to the first table where they are supported on one of their twine or wire bearing sides, commonly referred to as a "flat" side of the bale. Then, the first table is pivotally moved so as to lift and revolve the bales approximately 90° and deposit them on the second table of the wagon in the same desired edge side orientation as they will appear when subsequently transferred in stack form by the load bed of the wagon to the ground.

In order to enhance the stability of the stack, it is generally desirable to provide one or more tie tiers within the stack, such being tiers having individual bales arranged to overlap two bales in adjacent tiers above and below the the tier. Formation of one or more tie tiers can be accomplished during formation of the stack on the bale wagon, for example, through utilization of a mechanism which is similar to that illustrated and described in U.S. Pat. No. 3,395,814 and has been incorporated into several present day commercial models of the Grey bale wagon.

Overall, the stacks of bales formed by these current models of the Grey bale wagon, wherein all of the bales are oriented on their edge sides, have satisfactory stability.

However, with respect to stacks which must conform to certain legal width restrictions in order for transport on public highways by trucks and are formed of bales having certain size dimensions, it has been found more desirable to orient the bales of all of the tiers of the stacks, including the tie tiers, but excluding the lowermost tier, on their flat sides. For example, in the case of bales having the approximate size dimensions of 16 inches (edge side width) × 23 inches (flat side width) × 46 inches (length), being most prevalent in the southwestern region of the U.S., bales oriented on their flat (23 inches wide) sides each cover a surface area having a length approximately twice that of its width and thus may be formed by some current Grey bale wagon models into compact, square tie tier patterns utilizing a tie mechanism similar to that disclosed in the aforementioned U.S. Pat. No. 3,395,814, as well as a compact and square standard tier pattern, if such models were adapted to pick up bales lying on their flat sides in the field. Standard and tie tiers having such a compact and square configuration would form a block-type stack which conforms to the legal width and tier pattern restrictions for public highway transportation.

Although current models of the Grey bale wagon utilizing the aforementioned tie mechanism could readily be adapted, by widening their bale loader, to pick up bales placed on their flat sides on the field by a baler, as opposed to the prevailing, more desirable, practice of depositing bales on their edge sides in the field, and build a stack in which all bales of the standard and tie tier patterns would be oriented on their flat sides after the stack is unloaded upright from the bale wagon, the advantage described hereinbefore associated with orienting the bales of the lowermost tier on their edge sides would not be retained since the first table and its standard mode of operation as heretofore provided on all models of the Grey bale wagon up to the present most current ones do not have the capability of selectively depositing bales onto the second table in either one of an edge side or flat side orientation.

Additionally, although one manner of automatically providing the formation of bales into a tie tier pattern after a predetermined number of standard tier patterns have been formed and stacked on the bale wagon was disclosed in the aforementioned U.S. Pat. No. 3,395,814, which also disclosed in the above-referred to tie mechanism, none of the recent models of the Grey bale wagon, which have utilized a tie mechanism similar to the disclosed in aforementioned patent, have the capability of automatically forming bales into a tie tier pattern without the bale wagon operator closely monitoring and controlling the tier-forming operations on the second table on the bale wagon. The operator must count the tiers as they are formed and, at the proper moments, manually operate control levers to actuate the tie mechanism and, in some instances, partially cycle the second table to cause formation of the tie tiers.

SUMMARY OF THE INVENTION

The preferred embodiment of an improved bale wagon, as disclosed herein, includes several improved features for facilitating the formation of one preferred stack pattern, as well as alternative stack patterns, of the above-mentioned block-type stack, which overcome the above-described disadvantages of the aforementioned Grey bale wagon models.

While the improved features are particularly adapted for facilitating the formation of a block-type stack on a bale wagon, it is readily apparent that such features may be incorporated, either singly or together, into bale wagons for forming other types of stacks.

Some of the several improved features comprise inventions claimed in other co-pending applications, cross-referenced above; however, all of the improved features of the bale wagon are illustrated and described herein for facilitating a complete and thorough understanding of those of the features comprising the present invention.

The present invention relates to those features incorporated into a bale wagon for facilitating tier pattern selection and formation on the wagon.

Accordingly, the present invention broadly comprises, in a bale wagon having means for accumulating bales and a plurality of operable means associated with the bale-accumulating means for delivering bales thereto and arranging bales into a plurality of different tier patterns, improved means associated with the bale-accumulating means for sensing bale presence at any of a predetermined number of locations, improved means for selecting at which of the locations bale presence will be sensed by the sensing means, and improved means for controlling the operation of some of the plurality of bale delivering and arranging means upon the sensing of bale presence at the selected locations to thereby facilitate arrangement of bales into a corresponding one of the tier patterns.

More particularly, the bale presence sensing means includes a plurality of paddles mounted to the bale-accumulating means at the predetermined locations. The paddles normally extend from the bale-accumulating means. Each of the paddles is movable to a depressed position upon being engaged by a bale to thereby sense its presence at that respective location of the paddle. Still further, the controlling means includes means for actuating some of the bale delivering and arranging means. The selecting means includes means movable between a plurality of different positions each respectively representing a different one of the plurality of tier patterns. Also, the selecting means includes means associated with the movable means and associated with the bale presence sensing paddles at each of their locations. The associated means may be activated by the movable means, upon diposition thereof at each of its different positions, for selecting ones of the paddle locations by connecting the paddle or paddles at the selected location or locations to the actuating means such that the actuating means will cause operation of some of the bale delivering and arranging means upon the sensing of bale presence at the selected location or locations.

Further, more particularly, a memory element is provided having successive positions defined thereon for storing a predetermined sequence of the plurality of tier patterns. Each position represents one of the tier patterns. Also, means are movably coupled to the movable means of the selecting means and associated with the memory element. The latter means is responsive to each of the memory element positions to cause disposition of the movable means of the selecting means at one of its positions which corresponds to the one of the tier patterns represented by such memory element position. Further, means are provided for successively disposing the coupled and associated means at each of the memory element positions.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIGS. 4 and 5 are schematic representations of at least one bale being delivered by the bale-receiving means of FIG. 3 on its edge side onto the front portion of the second table;

FIGS. 6 and 7 are schematic representations of the bale being delivered by the bale-receiving means of FIG. 3 on its flat side onto the front portion of the second table;

FIG. 8 is a schematic representation of the hydraulic circuit associated with the hydraulic cylinders for driving the bale-receiving means;

FIG 10 is another enlarged perspective view of the second table actuating mechanism of FIG. 9, as seen when standing along the left side of the bale wagon;

FIG. 12 is an enlarged, perspective view on the load bed, rolling rack and rolling rack hydraulic cylinder of the bale wagon of FIG. 1;

FIG. 13 is a schematic representation of the hydraulc circuit associated with the rolling rack cylinder;

FIG. 21 is an enlarged, fragmentary top plan view of some of the linkages for controlling the actuation of a tie spike component of the tier-forming mechanism and for controlling a selector valve for the first table, such linkage being mounted to the right side of the bale wagon chassis below the front end of the second table at the location shown in outline in FIG. 3;

FIG. 22 is an elevational view of FIG. 21, as seen from along the right side of the bale wagon;

FIGS. 23 to 26 are enlarged perspective views of the three basic tier patterns into which bales are formed on the second table of the bale wagon of FIG. 1, wherein FIG. 23 illustrates the standard tier pattern with all bales resting on their edge sides, FIG. 24 illustrates the standard tier pattern of FIG. 23 except all bales are resting on their flat sides, FIG. 25 illustrates a double rail tie tier pattern with all bales resting on their flat sides and FIG. 26 illustrates a center rail tie tier pattern with all bales resting on their flat sides;

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

IN GENERAL

Figure 2:
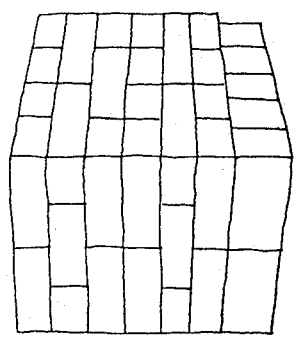
FIG. 2 is a perspective view of the standing block-type stack on a smaller scale than that of FIG. 1, showing the stack after it has been deposited upright on the ground or the like by the bale wagon of FIG. 1, with the bales of lowermost tier resting on one of their edge sides and the bales of the remaining tiers resting on one of their flat sides.
Figure 1:
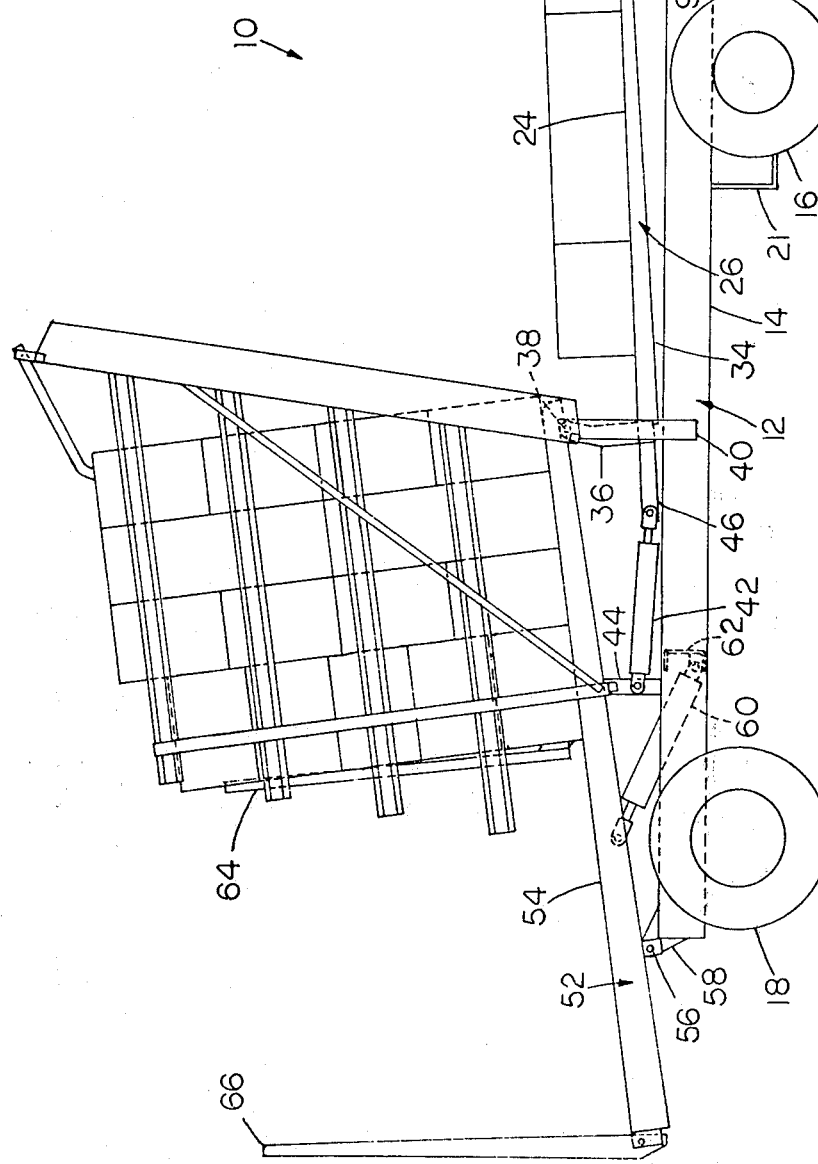
FIG. 1 is a side elevational view of a bale wagon embodying the principles of the present invention, showing the bale wagon with a partially formed block-type stack of bales on its load bed and during formation of a tier of bales on its second tier-forming table.

Referring now to the drawings, and particularly to FIG. 1, there is shown a bale wagon, being indicated generally by the numeral 10, comprising the preferred embodiment of the present invention for forming a preferred block-type, tie or interlocked stack of bales, as shown in FIGS. 2.

The bale wagon 10 is provided with a mobile chassis, indicated generally at 12, formed of left and right longitudinally extending channels 14 (only the right channel being shown), suitably interconnected by spaced transverse channels (not shown), and front and rear parts of wheels 16, 18, only the right front and rear wheels of each pair being shown in FIG. 1, for movably supporting the interconnected channels 14. On the forward ends of the channels 14 is mounted a cab 20 for housing the operator and various controls for the wagon. A source of power, such as a engine (not shown) is suitably mounted on the chassis 12 within a support structure 21 fixed between channels 14 for driving, preferably, the rear pair of wheels 18. Although the wagon illustrated is a self-propelled type, it could readily take the form of a pull-type wagon with the forward ends of the channels 14, instead of mounting the cab 20, converging in an assembly which would adapt the wagon to be secured to a tractor, or other towing vehicle, located at the front of the wagon.

Mounted near the forward end of the mobile chassis 12, immediately rearwardly of the cab 20, and extending transversely thereto, is a first improved feature employed by the bale wagon 10, such feature being means for receiving bales, generally indicated by the numeral 22 and hereinafter referred to as the improved first, bale-receiving table of the wagon 10. The first table 22 is positioned adjacently along and generally below a bale-supporting area, generally designated 24, defined by bale-accumulating means hereinafter referred to as the second, tier-forming table of the wagon 10, generally indicated by the numeral 26.

The improved first table 22 is selectively operable in either one of two modes to lift the bales received thereon on their flat sides upwardly and deposit the bales on the bale-supporting area 24 on either one of the edge or flat sides of the bales. The improved construction of the first table 22 and the components for operating it in either one of its two modes will be described in greater detail hereinafter.

It will be understood by those skilled in the art, that the bales are first introduced to the first table 22 by means of a bale loader or pickup, generally indicated at 28, which is mounted to the chassis 12 at the right end of the table 22 and operative to lift bales, resting on one of their edge sides, from the ground and direct them through a generally 90 degree arcuate lateral path to the right receiving end of the table 22. The loader 28 is generally similar to the one illustrated and described in U.S. Pat. No. 2,848,127 and need not be illustrated and described in detail herein for a thorough and clear understanding of the present invention.

Also, it will be understood by those skilled in the art, that a cross conveyor 30 (FIGS. 5 and 7) is operatively mounted to the chassis 12 and longitudinally extends along and above certain spaced structural portions of the first table 22 from approximately the right receiving end to near the middle thereof for moving the bales laterally from the loader 28 toward the left end of the first table 22. The cross conveyor 30 is generally similar to the one illustrated and described in the aforementioned U.S. patent and need not be illustrated and described in detail herein for a thorough and clear understanding of the present invention.

The second, tier-forming table 26 is formed by an L-shaped structure having a forwardly extending leg portion 34 across which is defined the area 24 which provides a surface upon which bales are supported and formed into a tier and an upwardly extending rear leg portion 36 which is pivotally secured at 38 between spaced apart upstanding brackets 40, only the right one being shown in FIG. 1, mounted on the longitudinal channels 14. A hydraulic cylinder 42 is pivotally secured at its anchor end to a frame member 44 mounted between the longitudinal channels 14. The rod end of the hydraulic cylinder 42 is pivotally secured to the free end of an arm portion 46 which is fixedly secured to, and extends rearwardly from, the L-shaped structure of the second table 26.

When the second table 26 is in its normal horizontal tier-forming position, as shown in FIG. 1, it rests at its forward end on a transverse support member, not shown, fixed to front brackets 48, only the right one being seen in FIG. 1. When the requisite number of bales have been accumulated and formed on the second table 26 in a suitable manner into either a standard tier pattern, or one of several tie tier patterns through utilization of other improved features provided on the bale wagon 10, which will be described hereinafter and includes a tie spike mechanism 50, being similar to that disclosed in aforementioned U.S. Pat. No. 3,395,814, mounted to the transverse support member and positioned below the second table 26, the hydraulic cylinder 42 is actuated so as to extend and cause the table 26 to swing or pivot upwardly generally 90° about its pivot point 38 to a generally vertical position adjacent the front end of the rearwardly disposed tier-accumulating means hereinafter referred to as the load bed, or third load table, being generally indicated by the numeral 52. In this manner, the tier of bales formed on the second table 26 is transferred to the load bed 52.

The load-carrying bed 52 includes a platform assembly 54 which is pivotally mounted at 56 between spaced apart upstanding rear brackets 58, only the right one being shown in FIG. 1, mounted on the longitudinal channels 14. A pair of spaced apart hydraulic cylinders 60, only the right one being shown, are pivotally secured at their anchor ends to transverse frame member 62 being fixed between channels 14 and at their rod ends to the platform assembly 54. When the load bed 52 is in its normal, generally horizontal tier-receiving position, as shown in FIG. 1, it rests at its forward end on upstanding brackets 40. A stack of bales is progressively formed on the load bed 52 upon successive delivery thereto of tiers of bales by pivotal movement of the second table 26 from its normal horizontal tier-forming position of FIG. 1 to its generally upright position adjacent the forward end of the load bed 52.

As the first tier of bales is delivered or deposited onto the load bed 52, a rolling rack for supporting the rear of the load being formed on the load bed 52, being generally indicated by the numeral 64 and longitudinally movable rearwardly along the load bed by the load being formed and forward by a hydraulic cylinder (not shown in FIG. 1), is contacted by the tier and forced to move rearwardly along the load bed 52 against the residual holding pressure of the hydraulic cylinder. It will be understood by those skilled in the art, that while the rolling rack 64 is held by hydraulic pressure at the position to which it has been moved along the load bed 52, the pressure of the rolling rack cylinder is overcome with the delivery of each successive tier of bales from the second table 26 to the front end of the load bed 52 whereby the rolling rack 64 is forced to move rearwardly one bale width until the rack 64 reaches a generally rearmost position along the load bed 52, depending upon the desired number of tiers forming the stack, whereupon a complete stack has been formed on the load bed 52.

The aforementioned other improved features on the bale wagon 10, which features will be described hereinafter, also include the rolling rack 64 and relate to the role it plays the manner of selecting which of the several tier patterns will be formed on the second table 26 of the bale wagon 10.

When the load bed 52 has been loaded with the desired number of tiers, the stack can be transferred to the ground in the form of a composite stack by extension of the hydraulic cylinders 60 which cause the load bed 52 to pivot generally 90° about point 56 from its generally horizontal position of FIG. 1 to an upright position in which the rolling rack 64 and the rear end of the load bed 52 which mounts additional upright support tines 66 are disposed adjacent the ground.

THE IMPROVED FIRST TABLE

Figure 3:
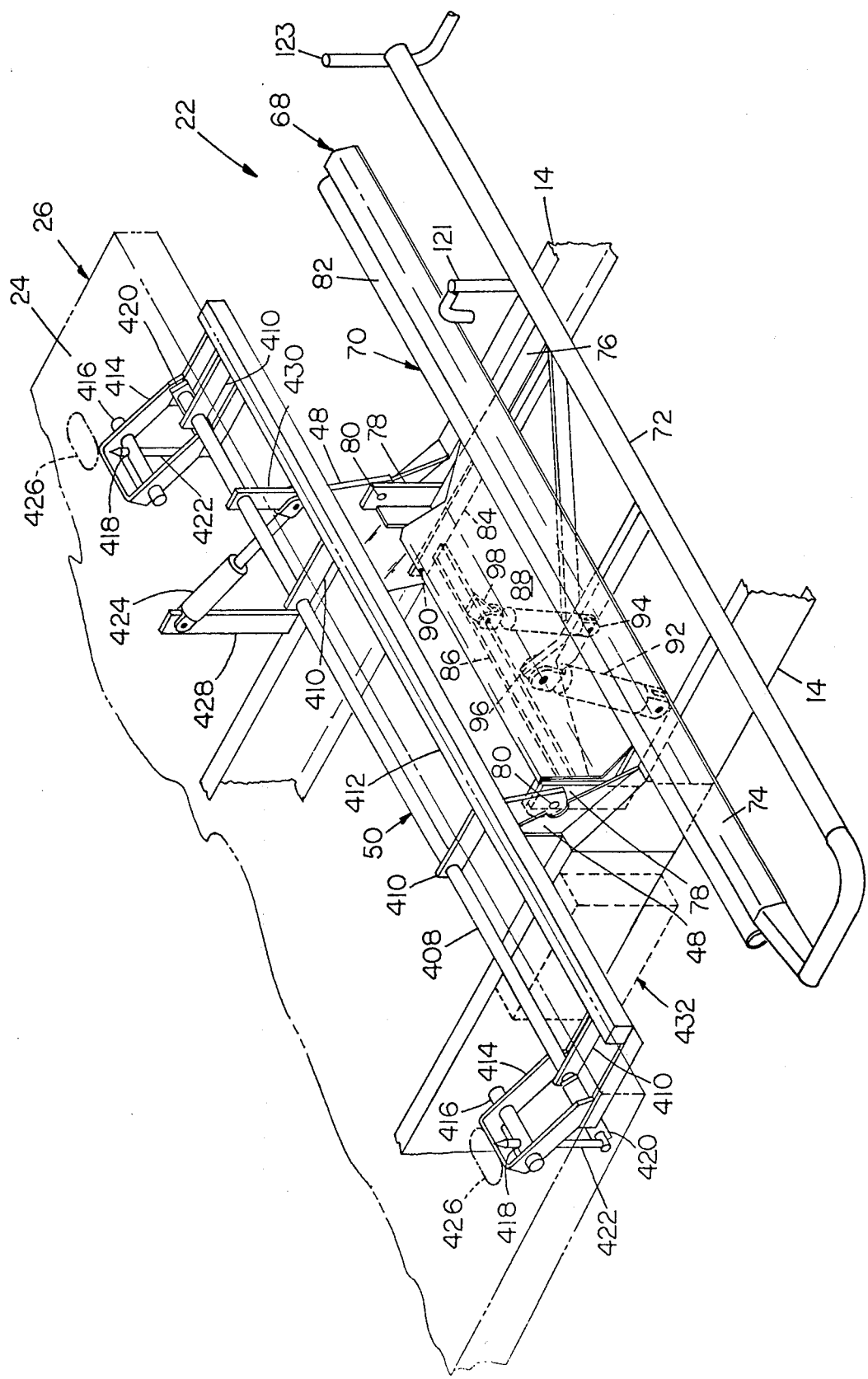
FIG. 3 is an enlarged perspective view of the front portion of the bale wagon of FIG. 1, which portion is located immediately rearwardly of the wagon cab, showing the bale-receiving means, the front portion of the second tier-forming table in phantom, a tie spike mechanism associated with the front second table portion, and the outer and inner trip levers for the bale-receiving means.

The improved first table 22 is illustrated in detail in FIG. 3 and generally includes first and second structures, generally designated 68 and 70 respectively.

The first structure 68 of the table 22, generally similar to the construction of the first table on the Grey bale wagon as known heretofore, is comprised by two transversely-extending and spaced-apart, front and rear beams 72, 74 which are mounted on a forwardly extending horizontal portion 76 of an L-shaped structure which also includes rear upwardly extending leg portions 78 which are pivotally secured at 80 between the spaced-apart upstanding front brackets 48 being mounted on the longitudinal channels 14. The front transverse beam 72 of the first structure 68 will support the bale (or bales) received on the first table 22 along one flat side of the bale at a location remote from the bale supporting area 24 of the second table, as seen in FIGS. 1 and 4. While the rear transverse beam 74 will support the bale (or bales) received on the first table 22 along the one flat side of the bale at a location near the second table 26, also as seen in FIGS. 1 and 4, the presence of the latter rear beam 74 is not essential for satisfactory operation of the improved first table 22 since the second structure 70, which will be described hereinafter, includes means for supporting the bale (or bales) at substantially the same location. The rear beam 74 is retained in the improved first table 22 only to enhance the structural integrity or strength of the first structure 68. The fact that it takes the shape or form as it appeared heretofore in the first table of the Grey bale wagon is a matter of expediency since other members having different constructions could be utilized to provide the necessary strength for the first structure 68.

The second structure 70 of the improved first table 22 was not heretofore present in the first table of the Grey bale wagon. Structure 70 is comprised by a transverse pipe 82 mounted on the forward ends of a pair of spaced-apart arms 84 being interconnected by a brace 86. The pipe 82 constitutes the aforementioned means of the second structure 70 which supports the bale (or bales) received on the first table 22 along the one flat side of the bale at the location near the second table, as seen in FIGS. 1 and 4. The rear ends of the arms 84 are pivotally secured at 90 between the upstanding brackets 48 generally below, inwardly from, and rearwardly of, the pivotal securement of the first structure 68 at 80 to the brackets 48. A shield piece 88 is fixed across the arms 84 rearwardly of the pipe 82 for helping to prevent the flow of hay chaff from the bales received on the first table 22 to under the front end of the second table 26 where the engine for the bale wagon 10 is preferably located on support structure 21.

The improved first table 22 further includes means for selectively operating the first and second structures 68, 70 in either one of two modes for moving the bale (or bales) upwardly to respectively deposit the bale on its edge side or flat side on the bale-supporting area 24 of the second table 26.

The means for selectively operating structures 68, 70 of the first table 22 includes first and second actuatable driving components being in the form of first and second hydraulic cylinders 92, 94.

The first hydraulic cylinder 92 is pivotally secured at its anchor end to the forward side of the engine support structure 21. Its rod end is pivotally secured to the free end of an arm 96 which is fixedly secured to, and extends rearwardly and upwardly from, the L-shaped structure of the first structure 68 of the first table 22. The first structure 68 normally rests on a generally horizontal, bale-receiving position, as shown in FIGS. 1, 4 and 6, with its beams 72, 74 upon the longitudinal channels 14. As the first hydraulic cylinder 92 is extended, the first structure 68 will swing or pivot approximately 90° upwardly about its pivot point 80 in a counterclockwise direction to a generally vertical, bale-discharging position adjacent the second table 26, as seen in FIGS. 5 and 7.

The second hydraulic cylinder 94 is pivotally secured at its anchor end also to the forward side of the engine support structure 21. Its rod end is pivotally secured to the free end of an arm 98 which is fixedly secured to, and extends rearwardly and downwardly from, the brace 86 of the second structure 70 of the first table 22. The second structure 70 normally rests in a generally horizontal, bale-receiving position, as shown in FIGS. 1 and 4, with its transverse pipe 82 being positioned rearwardly of, and adjacent, the rear beam 74 of the first structure 68 and overlapping and being supported by the forwardly extending horizontal portion 76 of the L-shaped structure of the first structure 68. As the second hydraulic cylinder 94 is extended, the second structure 70 will swing or pivot approximately 60° upwardly about its pivot point 90 in a counterclockwise direction to a generally forwardly-inclined position with its pipe 82 positioned adjacent the front edge of the second table 26, as seen in FIG. 6. Also, in view of the overlapping relationship of the pipe 82 of the second structure 70 with the first structure 68, the second structure 70, even when not positively driven by its second cylinder 92, will be carried to its upper position by the first structure, as is the case in FIG. 5, whenever the second structure 70 is initially resting at its horizontal position and only the first hydraulic cylinder 92 is actuated to pivot the first structure 68 to its upper, vertical position.

The means for selectively operating structures 68, 70 further includes hydraulic means, generally designated by numeral 100 in FIG. 8, for actuating the first and second hydraulic cylinders 92, 94 so as to operate the first and second structures 68, 70 of the improved first table 22 in either one of their two modes.

TWO MODES OF OPERATION OF IMPROVED FIRST TABLE

FIGS. 4 and 5 illustrate the respective positions of the structures 68, 70 comprising the improved first table 22, at the start and end of a first of the two modes of operation of the structures 68, 70. The first mode generally simulates the single mode of operation of the first table as heretofore provided on the Grey bale wagon and merely involves actuation (extension) of the first hydraulic cylinder 92. As has been explained hereinbefore, even though the second hydraulic cylinder 94 is not actuated during the first mode of operation of the first table 22, the second structure 70 is carried with the first structure 68 and pivoted from its lower to its inclined position. Accordingly, as in the case of the first table known heretofore, the operation of the improved first table 22 in the first mode lifts the bale resting on one of its flat sides through an approximately 90° arcuate path and deposits it on the area 24 of the second table 26 on an adjacent edge side of the bale.

FIGS. 4, 6 and 7 illustrate the respective positions of the structures 68, 70, comprising the improved first table 22, at the start, middle and end of a second of the two modes of operation of the first table structures 68, 70. In the second mode, initially the second hydraulic cylinder 94 is actuated (extended) and pivots the second structure 70 from its lower horizontal position of FIG. 4 toward its upper inclined position of FIG. 6. As the second structure 70 pivots, its pipe 82 lifts the longitudinal portion of the bale located adjacent the second table 26 upwardly which pivots the bale in a clockwise manner forwardly until its upper forward longitudinal corner contacts the rear side of the cab 20 (or contacts the rear side of a vertically disposed guide plate, not shown spaced rearwardly from, and mounted horizontally along, the rear side of the cab 20). The location of the rear side of cab 20 remote from the second table 26 and along the front beam 72 of first structure 68 limits movement of the tilted bale away from the second table 26. After contact of the bale with the cab 20, further pivoting of the second structure 70 to its upper position moves its pipe 82 relative to, and along, the flat side of the bale toward its rear lower longitudinal corner and to adjacent the front edge of the second table 26 and causes the bale to fulcrum about its upper forward longitudinal corner against the cab 20 and its lower forward longitudinal corner to drop rearwardly behind the front beam 72 of the first structure 68 which places the front beam 72 in contact with the forward edge side of the bale. It will be noted that after the middle position is reached, as shown in FIG. 6, the lower flat side of the bale is now tilted and aligned upwardly and rearwardly along a plane which extends above and past the front edge of the second table 26.

Once the second structure 70 has reached its upper position of FIG. 6, the first hydraulic cylinder 92 is actuated and pivots the first structure 68 from its lower horizontal position, as seen in FIGS. 4 and 6, toward its upper vertical position of FIG. 7. As the first structure 68 pivots, its front beam 72 pushes on the front edge side of the bale and thereby moves the bale upwardly along the aforementioned rearwardly inclined plane and onto the arm 24 of the second table 26, whereby the bale is deposited on the second table 26 on its same flat side.

Referring now to FIG. 8, there is shown the hydraulic means 100 for selectively actuating the first and second hydraulic cylinders 92, 94 so as to selectively operate the structures 68, 70 of the improved first table 22 in either one of their above-described two modes.

The hydraulic means 100 includes a first table selector valve 102 having a spool 104 being movable between an "out" position in which it selects or allows actuation of the improved first table 22 in the first of its two modes and an "in" position, as shown in FIG. 8, in which it selects or allows actuation of the table 22 in the second of its two modes. The selector valve spool 104 may be moved between its in and out positions by any suitable arrangement, such as by appropriate movement of a control lever in the cab 20 by the bale wagon operator, which lever is connected to the valve spool 104 by suitable mechanical linkage. However, preferably, the bale wagon 10 incorporates the mechanical trips and linkages illustrated in FIGS. 15, 21 and 22 and associated with the load bed 52 and the second table 26 for shifting the selector valve spool 104 between its out and in positions, respectively, as will be described in detail hereinafter.

The hydraulic means 100 further includes a first table valve 106 having a spool 108 being movable between an in position and an out position. When the spool 108 is at its in position, the first and second hydraulic cylinders 92, 94 are connected to the tank 110 and hydraulic fluid under pressure from a pump (not shown) via line 112 passes through the valve 106 and via line 114 flows to a hydraulic motor (not shown) for operating the cross conveyor 30. When the spool 108 is at its out position, as seen in FIG. 8, hydraulic fluid under pressure flows from line 112 through the valve 106 to line 116.

A first table delay valve 118 is also shown in association with the hydraulic means 100. The valve 118 has a spool 120 being movable between an out position, as seen in FIG. 8, in which fluid from line 116 passes through the valve 118 and therefrom to selector valve 102 via line 122, and an in position in which passage of fluid to the selector valve 102 (and thus to cylinders 92, 94) will be obstructed and thus the first table 22 will be prevented from actuation. Movement of the valve spool 120 to its in position may be controlled by a lever in the cab 20 or by automatic mechanical linkage which is responsive to either actuation of the second table 26 or movement of the bale loader 28 to its transport position in which it overlies the right end of the first table 22. Thus, the valve 118 performs the beneficial function of preventing damage through a collision between the first table 22 and the loader 28, but it does not represent an essential feature of the means 100 with respect to the present invention. Thus, for purpose of the present dicussion, it will be assumed that the valve 118 remains in its out position interconnecting lines 116 and 122.

Whenever a desired number of bales have been received on the first table 22, a suitable first table trip mechanism, similar to that heretofore provided on some recent commercial models of the Grey bale wagon, is engaged and moved which, in turn, moves the spool 108 of the first table valve 106 to its out position of FIG. 8. When only one bale is intended to be delivered by the first table 22 to the second table 26, an intermediate trip arm 121 is pivoted, by activation of suitable control means (not shown), upwardly between the beams 72, 74 of the first structure 68 and into the path of bale movement along the first table 22. Thus, when a single bale is received and conveyed along the first table 22, it engages and moves the arm 121. The spool 108, being connected to the arm 121 by suitable linkage (not shown), is then moved to its out position. When a pair of bales are intended to be delivered by the first table 22 to the second table 26, the intermediate trip arm 121 is pivoted, by deactivation of its control means, downwardly out of the path of bale movement along the first table 22. Thus, when two bales are received and conveyed along the first table, the second bale pushes the first bale into engagement with an outer trip arm 123, normally positioned in the bale path near the left end of the first table 22, and moves the arm 123. The spool 108, being connected to the arm 123 by suitable linkage (not shown), is moved to its out position.

Movement of the spool 108 to its out position allows hydraulic fluid flow under pressure to line 122 via line 116. The presence of one-way check valves 124, 126 in branch lines 128, 130 of line 132 prevent flow in these lines from line 116 to the cylinders 92, 94. Also, a flow line 134 is provided interconnecting flow line 122 with one path in each of the two pairs of flow paths through the valve 102. A relief valve 136 is connected in the line 134 which will normally prevent the flow of fluid from line 122 in line 134 to the valve 102 until a predetermined level of line pressure is reached. Such level is above the level of pressure needed to extend the second hydraulic cylinder 94. Thus, when the selector valve 102 is at its in position for operation of the first table 22 in its second mode to deposit the bales on their flat sides on the second table 26, the flow of fluid initially proceeds through valve 102 to the second cylinder 94 via line 138 to cause extension thereof, as seen in FIG. 6. Once the cylinder 94 has fully extended, a level of pressure is almost instantaneously reached which overcomes the spring bias of relief valve 136, whereby the flow of fluid proceeds in line 134 through valve 102 to the first cylinder 92 via line 140 to cause extension thereof, as seen in FIG. 7. When the cylinder 92 has fully extended with the first structure 68 pivoted to its upper vertical position, suitable mechanical linkage (not shown) such as has heretofore been provided on the Grey bale wagon, is tripped which moves the spool 108 of the first table valve 106 to its in position, allowing the first table to return to its lower position.

If the selector valve 102 had been at its out position for operation of the first table 22 in its first mode to deposit the bales on their edge sides on the second table 26, the flow of fluid would have proceeded from line 122 across through valve 102 to cylinder 92 via line 140 to cause extension thereof, as seen in FIG. 5. Once the cylinder 92 had fully extended with the first structure 68 pivoted to its upper vertical position (which also would carry second structure 70 to its upper position), the same aforementioned linkage would move the spool 108 of the first table valve 106 to its in position. Thus, the positive delivery of hydraulic fluid to the second cylinder 94 through relief valve 136 is not necessary in the operation of the first table 22 in its first mode.

Regardless of which mode of operation has just occurred, once the spool 108 of the first table valve 106 has moved to its in position, line 116 is connected through the valve 106 to the tank 110 and hydraulic fluid will return flow to the tank 110 via lines 140 to 128 to 132 to 116, via lines 138 to 130 to 132 to 116 and via lines 138 to 122 to 116.

IMPROVED FEATURES FOR STACK PATTERN STORAGE AND FORMATION

The bale wagon 10 disclosed herein employs several other improved features which allow the wagon operator to divert his attention from monitoring and controlling the tier-forming operations to guiding the bale wagon across the field, while still being able to build a stack of bales in a desired pattern on the wagon.

A first of the other improved features employed by the wagon relieves the operator of the necessity of remembering the particular stack pattern he wants to build and of constantly counting the tiers as they are formed and deposited on the load bed in order that he will be ready, at the proper moment, to actuate appropriate mechanisms and operations for forming a tie tier pattern on the second table to insure assembly of standard and tie tier patterns in the desired sequence for achieving the desired stack pattern.

A second of the other improved features relieves the operator of the responsibility for actuating and controlling the appropriate mechanisms and operations to form the tie tier pattern.

The first other improved feature provides the bale wagon with a memory in which is stored the desired stack pattern and thus the sequence in which standard and tie tier patterns are to be assembled. The first other improved feature further provides the bale wagon with means which senses completion of the final step of each tier-forming operation, that being, delivery of the tier just formed to the load bed, and activates the memory of the bale wagon to provide an instruction to the second other improved feature as to which of the tier patterns should be formed on the next following tier-forming operation. The second other improved feature then responds to the successive delivery of bales to the second table by the first table to automatically carry out the instruction received by causing bales to be formed in the desired tier pattern and delivered to the load bed. The activation of the improved second other feature, and, hence, utilization of the bale wagon memory to form the desired sequence of tier patterns, is initiated and perpetuated by successive loading and delivery of bales to the first table of the bale wagon.

The first other improved feature of the bale wagon 10 will now be described in detail, with the second other improved feature being described thereafter.

TIER PATTERN SEQUENCE STORAGE AND SELECTION

Each of the bale tiers forming the preferred stack pattern of FIG. 2 is in one of three basic patterns. One basic pattern is the standard tier pattern illustrated in FIGS. 23 and 24. Another basic pattern is the double rail tie tier pattern illustrated in FIG. 25. The last basic pattern is the center rail tie tier pattern illustrated in FIG. 26.

Figure 9:
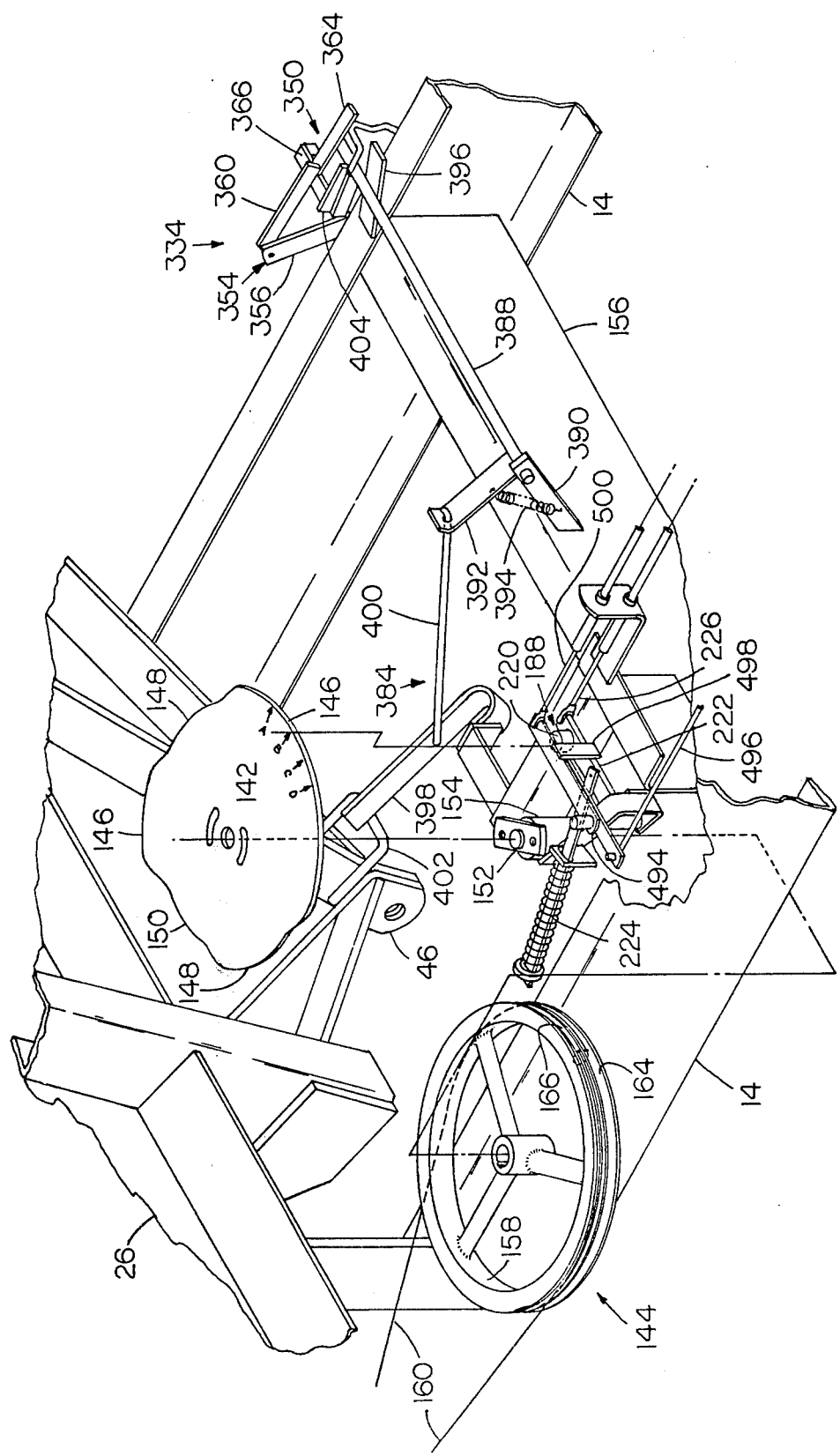
FIG. 9 is an enlarged, exploded perspective view of a second table actuating mechanism, and a storage cam, a cable drum and associated components for tier pattern sequence storage and selection, located below the second table of the bale wagon of FIG. 1, as seen when standing along the right side of the wagon.
Figure 11:
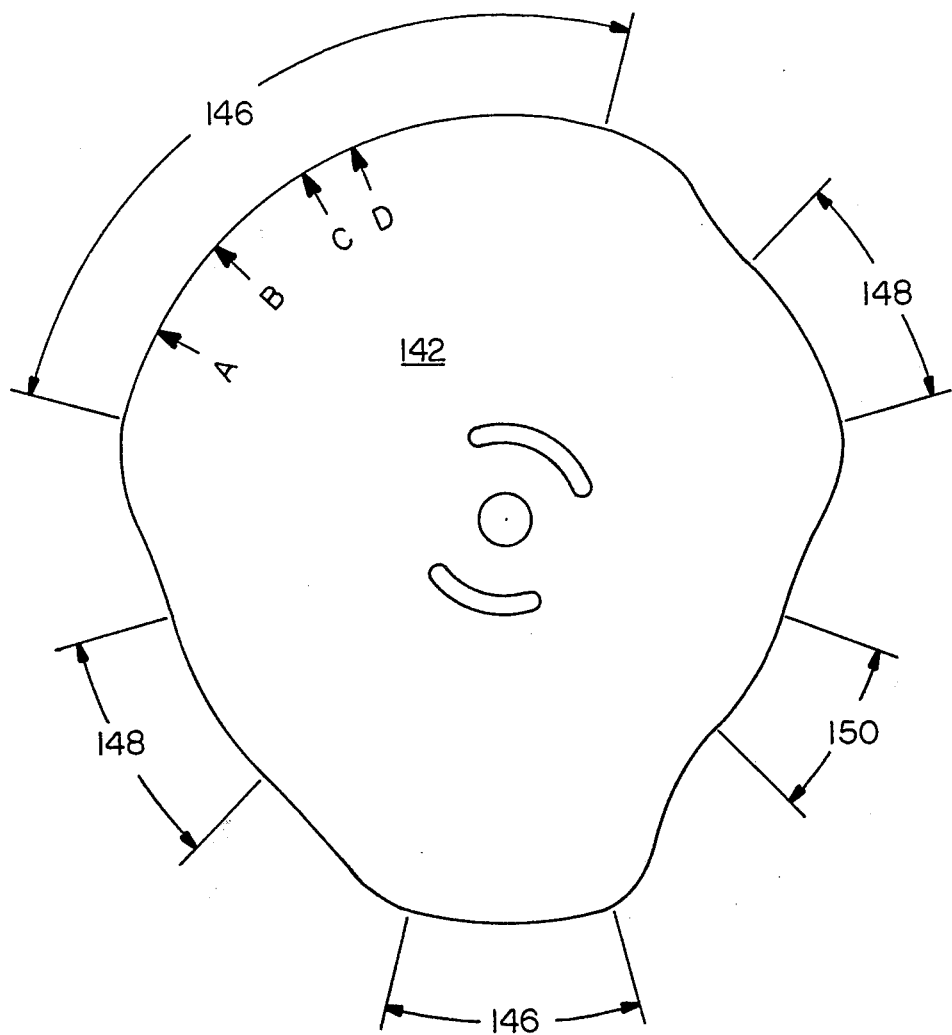
FIG. 11 is an enlarged plan view of the cam of FIG. 9 for storing tier pattern sequences, illustrating the various initial positions along the periphery of the cam at which a cam follower will be located prior to formation of different stack patterns by the bale wagon and the various lobes of the cam along which the cam follower will be located for formation of the standard tier patterns and two tie tier patterns on the second table of the bale wagon.

The first other improved feature of the bale wagon 10 relates to tier pattern sequence storage and selection and provides a memory element on which a desired sequence of these tier patterns may be stored. The memory element, being indicated by numeral 142, is illustrated in FIGS. 9 and 11. Further, the first improved feature provides means for sensing load or stack position along the load bed 52 during stack formation and for activating the memory element 142. Such sensing and activating means, being generally indicated by numeral 144, is illustrated partially in both FIGS. 9 and 14.

Figure 24:
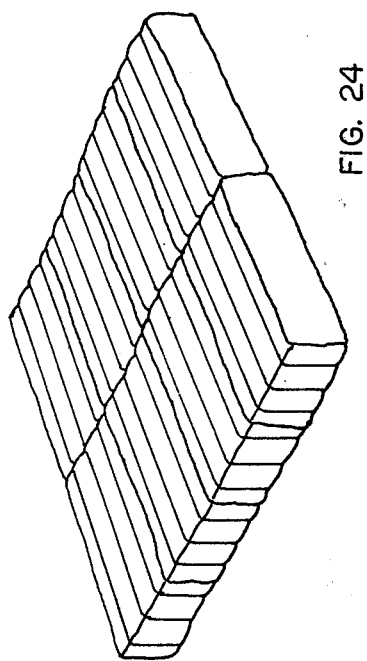
Figure 23:
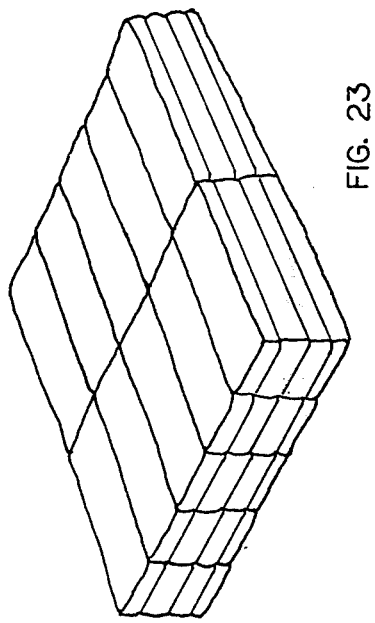

Referring to FIGS. 9 and 11, the memory element 142 of the first improved feature is in the form of a cam plate having a continuous peripheral edge on which is defined several platforms or lobes 146, 148, 150 which each correspond to, or represent, one of the standard and tie tier patterns and are arranged about the periphery of the cam plate 142 in a sequence which corresponds to the desired sequence of the three basic tier patterns within the preferred stack pattern. Lobe 146 represents a standard tier pattern, lobe 148 represents a double rail tie tier pattern, and lobe 150 represents a center rail tie tier pattern. It should be mentioned here, that, with respect to any of the basic tier patterns and particularly to the standard tier pattern, the selection of whether to position the bales on their edge sides, as shown in FIG. 23, or flat sides, as shown in FIG. 24, is not determined by the cam plate 142. Other means are provided for facilitating such selection and will be described later on in the application.

The lobes 146, 148, 150 are generally in the shape of arcs which are respectively struck by radii of different lengths and having a common axis of revolution.

The cam plate 142 is adjustably fixed on the upper end of a shaft 152 which is rotatably mounted in a support assembly, generally indicated as 154, being located below the rear end of the second table 26 and mounted to a transverse frame member 156 extending between the channels 14 of the chassis 12. The axis of rotation of the cam plate 142 and shaft 152 is common with the axis of revolution of the arcs defining lobes 146, 148, 150 on the cam plate periphery.

Referring now to FIGS. 9 and 12 through 14, the means 144 of the first improved feature utilizes the rolling rack 64, its hydraulic cylinder 65 and hydraulic circuitry associated therewith, a cable drum 158 and motion transmitting means in the form of cables 160, 162 being routed along an endless path and interconnecting the rolling rack cylinder 65 and the cable drum 158, for sensing stack position as it is being formed on the load bed and for activating the memory element or cam plate 142.

The cable drum 158 is fixed on the lower end of the shaft 152 below the cam plate 142. Thus, the cable drum 158 also rotates about the same axis as the shaft 152 and cam plate 142. The drum 158 has lower and upper grooves 164, 166 with respective adjacently positioned lower and upper holes formed therein through the drum structure. In its initial position, as shown in FIG. 9, the drum 158 is oriented such that the holes in grooves 164, 166 face toward the front of the bale wagon. The cable 160 extends from along the rear left side of the lower groove 164 clockwise through approximately ¼ of the circumference of the drum 158, passes through the one hole of the lower groove 164 to the interior of the drum 158, loops back through the hole of the upper groove 166 to the exterior of the drum 158 and then wraps clockwise within the upper groove 166 around the drum 158 through approximately 1¼ times the circumference of the drum 158. Then, the two right and left portions of the cable 160 extend rearwardly from the drum 158 along and between the channels 14 of the chassis 12 to the rear end thereof, over a first pair of idler pulleys, generally designated 168, being rotatably mounted on a transverse frame member 170 of the chassis 12 and a second pair of idler pulleys, generally designated 172, being rotatably mounted on transverse frame member 62 of the chassis 12 and about a third pair of idler pulleys, generally designated 174, being rotatably mounted on a rear transverse frame member 176 of the chassis 12. From the third pair of idler pulleys 174, the right portion of cable 160 extends over a single idler pulley 178, being rotatably mounted to the underside of the platform assembly 54 of the load bed, to one of the ends of the cable 160 which is attached to the piston rod end 180 of the rolling rack hydraulic cylinder 65. Also, from the third pair of idler pulleys 174, the left portion of cable 160 extends to the other of the ends of cable 160 which is coupled through a spring 182 to one end of the other cable 162. The other cable 162 extends therefrom to the forward end of the load bed 52 along the underside of its platform assembly 54, about another single idler pulley 184, being rotatably mounted to the platform assembly 54, and therefrom rearward to its other end being attached to the piston rod end 180 of the rolling rack cylinder 65. Adjustment of the tension of spring 180 by a turnbuckle 186, being coupled between spring 182 and the one end of cable 162, removes slack from the interconnected cables 160, 162 such that movement of the rod end 180 of cylinder 65 is effectively transmitted by the cables 160, 162 to the cable drum 158 so as to cause rotation of the drum 158 and, thus, simultaneous rotation of the cam plate 142.

From the preceding, partially completed description of the means 144, which is embodied by those elements which sense stack position along the load bed 52 during stack formation and activate the memory of the bale wagon 10, it is readily understood that such activation of the bale wagon memory is represented by rotation of the cam plate 142. Before completing the description of the means 144 which respect to those of its elements which facilitate accurate sensing of the stack position along the load bed 52, it would be beneficial to again refer to cam plate 142 depicted in FIG. 11 and recall that lobes 146, 148, 150 are arranged about the periphery of the cam plate 142 in a sequence which corresponds to, and provides a memory for, the desired sequence of the three basic tier patterns within the preferred stack pattern of FIG. 2. Also, it should be mentioned that not only are the lobes 146, 148, 150 arranged, and displaced both circumferentially and radially from one another, about the cam plate periphery to store the sequence of the three basic tier patterns for the preferred stack pattern of FIG. 2, but also to store respective sequences for three alternative stack patterns, being shown in FIGS. 49 to 51. Thus, four different stack patterns are stored in the memory of the bale wagon 10. Further, it is readily apparent that cam plates having other lobe arrangements, and thus other tier pattern sequences stored thereon, may be interchanged for the one illustrated in FIG. 11 in order to form still other stack patterns on the bale wagon 10.

Prior to beginning formation of one of the four different stack patterns on the bale wagon 10, the cam plate 142 must be adjusted about the shaft 152 such that one of the positions A, B, C, or D being indicated on the cam plate 142 in FIGS. 11, which corresponds to the stack pattern to be formed, is aligned with a cam follower, indicated as 188 in FIG. 9. The cam follower 188 is the element of the second improved feature which receives an instruction from the memory of the bale wagon, that being, the lobe arrangement on the cam plate 142, and initiates transmission of that instruction to the remaining elements of the second improved feature so that the desired tier pattern will be formed, which elements will be described shortly hereafter.

The preferred stack pattern of FIG. 2 is represented by position B on the cam plate 142. In FIG. 9, the cam plate 142 is shown adjusted to position B.

It has been explained hereinbefore that movement of the rod end 180 of the rolling rack cylinder 65 causes rotation of the cam plate 142. An improved arrangement of the rolling rack 64, its cylinder 65 and a hydraulic component associated with the cylinder 65, comprising the other elements of the means 144 of the first improved feature, allows accurate sensing of successive stack movements and positions along the load bed 52 during stack formation thereon which insures successive rotation of the cam plate 142, via the interconnected motion transmitting cables 160, 162 and the cable drum 158, to a desired sequence of angular positions with respect to the cam follower 188.

After one tier of bales has been placed on the load bed 52 and as each subsequent tier is delivered thereto, the tier or tiers standing upright thereon are moved toward the rear end of the load bed 52 through a distance equal to the width of the flat or edge side of the bales, depending upon which of the sides of the bales is oriented in a horizontal plane, as the tier is delivered to the front end of the load bed 52. For example, in the case of bales having the dimensions 16 inches × 23 inches × 46 inches, a tier delivered to the load bed 52 having bales oriented to rest on their edge sides either on the load bed 52 or on top of each other (which bales will be oriented to rest on their flat sides either on the ground or on the next lowermost tier when the stack is deposited on the ground) will move the stack of tiers, already positioned on the load bed 52, rearward through a distance of 16 inches on the width of a bale edge side. A tier having bales oriented to rest on their flat sides either on the load bed 52 or on top of each other will move the stack rearward through a distance of 23 inches or the width of a bale flat side.

In order to store the desired sequences of tier patterns on the cam plate 142, as well as compensate for the fact that some of the tiers may have their bales stacked or resting on their flat sides, while others may be on their edge sides, the displacements between the lobes 146, 148, 150 about the cam plate periphery must be proportionate to, and accomodate, the various sequences of 16 and 23 inch dimensions of the stack tiers. However, with respect to the four different stack patterns stored on cam plate 142, at least four of the tiers in each stack pattern are arranged in an identical sequence of both standard and tie tier patterns, as well as side orientations. Thus, with respect to these four tiers, the displacements between the respective lobes are equal. These four tiers are represented on the cam plate 142 of FIG. 11 by the counterclockwise sequence of double rail tie tier pattern lobe 148, standard tier pattern lobe 146, center rail tie tier pattern lobe 150 and double rail tie tier pattern lobe 148. These four lobes have equal arcuate lengths of 30° and their centers are displaced from one to the next by 60°. In the preferred, position B stack pattern of FIG. 2 and the positions A and C stack patterns of FIGS. 49 and 50 respectively, by counting upwardly from the lowermost tier of the stacks, these four tiers correspond to the third through sixth tiers of the stacks. In the position D stack pattern of FIG. 51, these four tiers correspond to the fourth through seventh tiers of the stack. The position A, B and C stack patterns differ in their first and second tiers with respect to side orientations of the bales of these tiers. In the position A stack pattern, bales in both of these tiers rest on their edge sides on the load bed and on their flat sides when the stack is uprighted on the ground. In the position B stack pattern, bales in the first tier rest on their flat sides on the load bed and on their edge sides in the uprighted stack, while bales in the second tier rest on their edge sides on the load bed and on their flat sides in the uprighted stack. In the position C stack pattern, bales in both of these tiers rest on their flat sides on the load bed and on their edge sides in the uprighted stack. In the position D stack pattern, bales in the first, second and third tiers rest on their edge sides on the load rack and on their flat sides in the uprighted stack. The first and second tiers of positions A, B and C stack patterns are all of the standard tier pattern, as are the first through third tiers of the position D stack pattern. The position A stack pattern is seven tiers high with the seventh tier being in the standard tier pattern and the bales thereof resting on their edge sides on the load bed and on their flat sides in the uprighted stack. The position B stack pattern may be either 7 or 8 tiers high with the seventh (and eighth) tier being in the standard tier pattern and the bales thereof oriented as in the seventh tier of position A stack pattern. The position C stack pattern is 8 tiers high with both the seventh and eighth tiers being in the standard tier pattern and the bales thereof also oriented as in the seventh tier of position A stack pattern. The position D stack pattern is nine tiers high with its eighth and ninth tiers being identical to the seventh and eighth tiers of position C stack pattern.

The above-noted differences in the side orientations of bales in first two tiers of the four stack patterns, as well as the variation in the number of standard pattern tiers at the bottom and top portions of the four stack patterns, is compensated for on the first standard tier pattern lobe 146 of the cam plate 142, which has initial positions A, B, C and D indicated thereon, by its greater arcuate length than that of the other four lobes and the displacements between the initial positions. The first lobe 146 has an arcuate length of 90°.

From the foregoing description of the four stack patterns stored by the cam plate 142, the importance of accurate sequential rotation of the cam plate 142 with respect to the cam follower 188, such that the cam follower 188 is successively positioned on the lobes 146, 148, 150 as arranged on the cam plate 142, will be appreciated.

At the start of bale wagon operation for forming any one of the stack patterns, the rolling rack 64 is positioned near the forward end of the load bed 52, preferably 23 inches therefrom, and the cam plate 142 is aligned with the cam follower 188 at a desired one of the A, B, C or D positions. The rolling rack 64 was initially moved to such position by its cylinder 65. The cylinder 65 is of a single-acting type having its anchor end secured to a rear beam 190 of the load bed platform assembly 54. The cylinder 65 extends within a longitudinal slot 192 in the platform assembly 54 and is clamped near its forward end to a transverse brace 194 located generally at the longitudinal middle of the assembly 54 and bridging the assembly slot 192.

As seen in FIG. 12, the rolling rack 64 includes a carriage portion 196 which supports a plurality of upright support members 198 and is mounted within the assembly slot 192 for fore-and-aft movement along the load bed 52. A cable 200 is secured at one end to the carriage portion 196, extends therefrom in a forward direction and then about a pulley 202, being rotatably mounted on the piston rod end 180 of the cylinder 65, and finally extends therefom in a rearward direction to its other end which is secured to the brace 194. Extension of the cylinder 65 moves the rolling rack from the rear to near the front of the load bed 52 such that cylinder extension is equal to one-half the total distance of rack movement.

The cable drum 158 is constructed such that one revolution of the drum 158 will meter out a length of the cable 160 equivalent to ½ of the total combined widths of 6 tiers of bales resting on their edge (16 inches) sides on the load bed 52. Thus, as the rolling rack 64 is moved through a distance equal to the combine widths of 6 tiers of "on edge" bales, for example 96 inches, the drum 158 and cam plate 142 are rotated one revolution. This will be equivalent to formation of the position B stack pattern, since the first tier of "on flat" bales, as placed on the load bed 52, does not move the rolling rack 64 due to the initial position of the rolling rack 64 approximately 23 inches from the front end of the load bed 52, while each of the next 6 tiers of "on edge" bales, as placed on the load bed 52, moves the rolling rack 64 approximately 16 inches and thereby rotates the cam plate 142 approximately 60°, starting from position B along lobe 146, to successive positions along lobes 148, 146, 150, 148 and back to initial position B along lobe 146. Thus, the cam plate 142 is rotated a total of approximately 360°, or one revolution, during formation of the position B stack pattern.

In the formation of position A stack pattern, the rolling rack 64 is moved through a distance somewhat less than the combine widths of 6 tiers of "on edge" bales, since the first tier placed on the load bed 52 does not cover all of the 23 inch displacement between the rolling rack 64 and the front end of the load rack 52. However, return of the rolling rack 64 to its initial forward position along the load bed 52 will reverse rotate the cam plate 142 back to the initial position A.

In the formation of positions C and D stack patterns, the rolling rack 64 is moved more than the combined widths of 6 tiers of "on edge" bales, since more than 7 tiers are formed. The extra one-quarter turn of cable 160 about drum 158 allows the cam plate 142 to overrun its initial position. However, as in the case of position A, return of the rolling rack 64 to its initial forward position along the load bed 52 will also reverse rotate the cam plate 142 back to the respective one of initial positions C or D.

The rolling rack cylinder 65 only moves the rolling rack 64 in the forward direction. It is the force of a tier of bales being delivered to the front end of the load bed 52 by the second table 26 that causes rearward movement of the rolling rack 64.

Referring now to FIG. 13, hydraulic means is associated with the cylinder 65 for controlling its actuation. A component of the hydraulic means associated with the cylinder 65, being in the form of a relief valve 204, maintains sufficient pressure within the cylinder 65 between the moments of delivery of successive tiers to the load bed 52 by the second table 26 to thereby restrict movement of the rolling rack 65 to during only those moments when the second table 26 delivers the successive tiers. Thus, the rolling rack 65 will only be moved through a distance equal to the bale width of the respective tier being delivered and thereby the desired angular displacement of the cam plate 142, being proportional to such bale width, will be transmitted to the cam plate 142 via the cables 160, 162 and the cable drum 158.

As seen in FIG. 13, the relief valve 204, having a mechanical shutoff mechanism 206 the purpose for which will be explained later, is placed in the line 208 within which hydraulic fluid will flow from the cylinder 65 to the tank 210. As will be explained hereinafter the valve 204 provides the rolling rack 64 with a brake.

Initially, the spool 212 of a control valve 214 is moved from its centered position of FIG. 13 to a right position which allows hydraulic fluid flowing under pressure in line 216 to pass through control valve 214 to line 218 and then into the rolling rack hydraulic cylinder 65 to cause extension thereof and movement of the rolling rack 64 to near the forward end of the load bed 52. Once the rolling rack 64 has reached its initial forward position, the spool 212 is returned to its centered position of FIG. 13, blocking off pressure line 216. Fluid is prevented from evacuating from the cylinder 65 by relief valve 204. Thus, the rolling rack 64 is incapable of inadvertently creeping toward the rear end of the load bed 52 due to rough terrain or sudden accelerations in the movement of the bale wagon 10. Each time a tier of bales is delivered to the front end of the load bed 52 by the second table 26, the force of delivery of the tier against the support members 198 of the rolling rack 64, or against the front side of a partially completed stack on the load bed 52 being supported on its rear side by the support members 198 of the rolling rack 64, is transmitted through the rolling rack 64 to the piston rod end 180, via cable 200 and pulley 202, and finally to the fluid within the cylinder 65, and instantaneously reaches a level sufficient to overcome the preset force level of the spring of the relief valve 204 at which it will open. Once such level is passed, the valve opens and allows hydraulic fluid flow in line 208 from the cylinder 65 to the tank 210.

As fluid evacuates from the cylinder 65, the rolling rack simultaneously retreats toward the rear end of the load bed 52, but only for so long as the delivery force of the second table is being imposed on the rolling rack 64. Once tier delivery is completed and the force being imposed by the second table 26 is removed, the force transmitted to the rolling rack cylinder 65 diminishes below the preset level of the relief valve spring and valve 204 closes off line 208 and fluid flow to tank 210. Thus, the relief valve 204 prevents further rearward movement of the rolling rack 64 and insures that the rack 64 will only have moved, during delivery of the tier, through a distance equivalent to the width of the bales of the tier and, thus, the cam plate 142 rotatably moved through a desired proportional displacement.

From the above discussion, it will be realized that rotation of the cam plate 142 will automatically, and can only, occur upon addition or delivery of a tier of bales to the load bed 52. This eliminates the necessity of counting second table cycles in order to know when to form a tie tier pattern and also the possibility of getting the cam plate 142 out of its desired sequence, should the empty second table 26 be inadvertently cycled to its upper position.

The mechanical shutoff mechanism 206 of the relief valve 204 is utilized for facilitating unloading of either a complete or partially completed stack from the bale wagon 10. In either case, at the start of the pivotal tilting of the load bed 52, the mechanical shutoff mechanism 206 is shifted to prevent the relief valve 204 from opening the line 208 regardless of the forces imposed on the rolling rack 64 by the stack or partial stack as the load bed 52 is tilted. Then, the load bed 52 is pivoted until it reaches a great enough angle that all the bales of the complete or partial stack will slide as a unit. Following next, the spool 212 of the control valve 214 is moved from its centered position of FIG. 13 to a left position which connects line 218 to line 219 and thus to tank 210, which lets fluid from the cylinder 65 return flow to the tank 210 through the control valve 214. As a result, the rolling rack 64 will move downwardly to the rear end of the load bed 52 under the weight of the complete or partial stack. Once the stack is unloaded, the rolling rack may be returned to its initial forward position by moving the control valve 214 to its right position, which allows fluid under pressure to flow through the valve 214 into line 218 and into cylinder 65

TIER PATTERN FORMATION

The aforementioned second other improved feature of the bale wagon 10 relates to means for forming bales into the standard and tie tier pattern and provides for their automatic formation into either one of the double rail tie tier or center rail tie tier patterns, as well as the normal standard tier pattern, according to which ever one is selected by the memory of the bale wagon at any given time.

A first element of the tier-forming means has already been mentioned hereinabove, that being, the cam follower 188 which receives an instruction from the bale wagon memory, as represented by the lobe arrangement on the cam plate 142, and initiates transmission of that instruction to the remaining elements of the tier-forming means in order that a desired one of the three tier patterns will be formed on the second table 26 and delivered by the second table 26 to the load bed 52. It has also been mentioned that the lobes 146, 148, 150 are respectively in the shape of arcs respectively struck by radii of different lengths from a common axis of revolution. Thus, the instruction received by the cam follower from the bale wagon memory is represented by the position of the cam follower along one of the three arcs forming the lobes and thus at one of three possible radial distances from the center of the cam plate 142.

It will be readily understood, therefore, that the initial position of the cam follower 188 along the periphery of the cam plate 142, such as at either one of positions A, B, C or D along lobe 146, provides the first instruction from the memory with respect to which one of the three basic tier patterns will be formed during the next following tier forming operation. In the case of each of these initial positions, the instruction commands the formation of the standard tier pattern. Furthermore, it will be recognized that in the case of each of the position A, B, C and D stack patterns, the second instruction is identical to the first since delivery of the completed tier to the load bed 52 does not cause rearward movement of the rolling rack 64 and thus rotation of the cam plate 142. However, in the case of the position B stack pattern, for example, the third instruction is not the same as the second and first instructions, since delivery of the second tier moved the rolling rack 64 and thereby rotated the cam plate 142 such that the cam follower is now positioned along lobe 148, which in the preferred construction of the cam plate 142 has a radius of a length approximately 1 inch shorter than that of the radius of lobe 146. From inspection of FIG. 11, it is readily apparent that the fourth instruction is the same as the first and second instruction, while the fifth instruction is represented by the position of the cam follower 188 along lobe 150, which in the preferred construction of the cam plate 142 has a radius of a length approximately 1 inch shorter than that of the radius of lobe 148, and thus 2 inches shorter than that of the radius of lobe 146. The sixth instruction is identical to the third, and the seventh is identical to the first and second.

Referring now to FIG. 9, the cam follower 188 includes a roller 220 mounted to one end of an arm 222 being pivotally mounted at its opposite end to support assembly 154 and loaded by spring biasing assembly 224 to follow the periphery of the cam plate 142 as the latter is rotated clockwise as seen in FIG. 9, whereby the movement of the cam follower 188 may be toward and away from the center of the cam plate 142 as the cam plate 142 rotates and changes the position of the cam follower 188 from along one of the lobes 146, 148, 150 to another. The end of the arm 222 of the cam follower 188 which mounts the roller 220 also pivotally mounts an end of a push-pull cable 226 which has its other end pivotally connected to one of the remaining elements of the tier-forming means.

Figure 16:
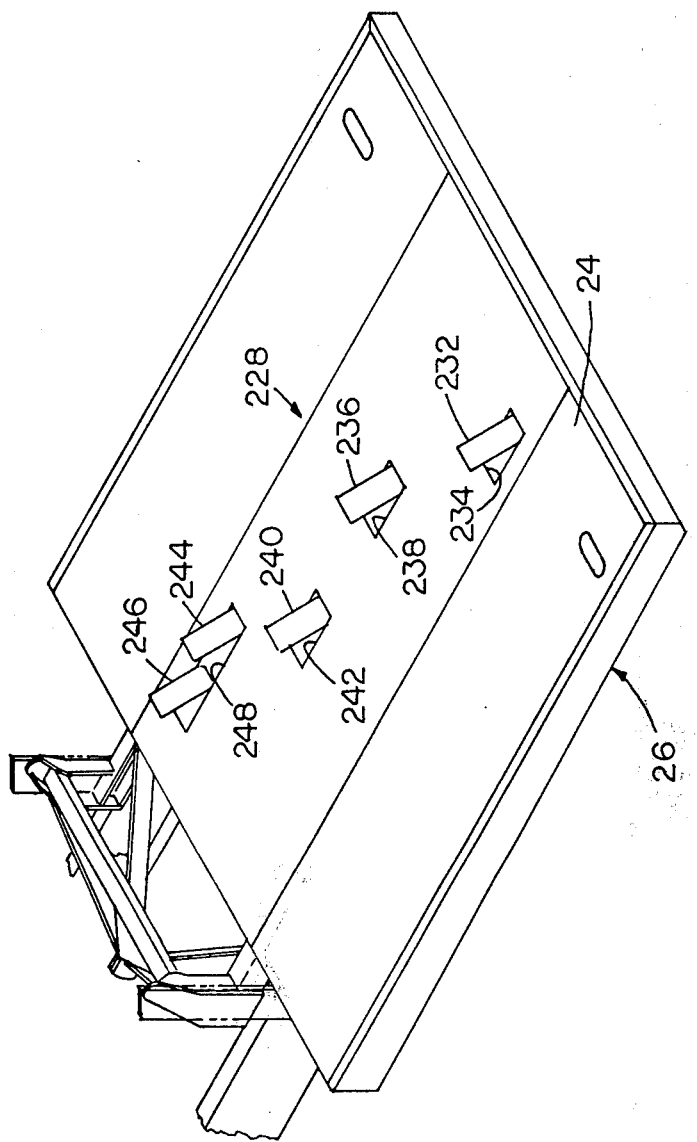
FIG. 16 is an enlarged perspective view of the second table of the bale wagon of FIG. 1, showing the respective positions of sensor paddles of a tier-forming mechanism being mounted through respective openings in the second table.

The remaining elements of the tier-forming means includes means arranged on the second table 26 for sensing bale position during tier formation thereon, being generally indicated by numeral 228 in FIG. 16, and means, being generally designated as numeral 230 in FIGS. 17 through 20A, which receives the instruction transmitted thereto from the cam follower 188 and activates the second table bale position sensing means 228 such that the one of the standard and tie tier patterns, commanded by the instruction received, will be formed during the next tier-forming operation on the second table 26.

Figure 17:
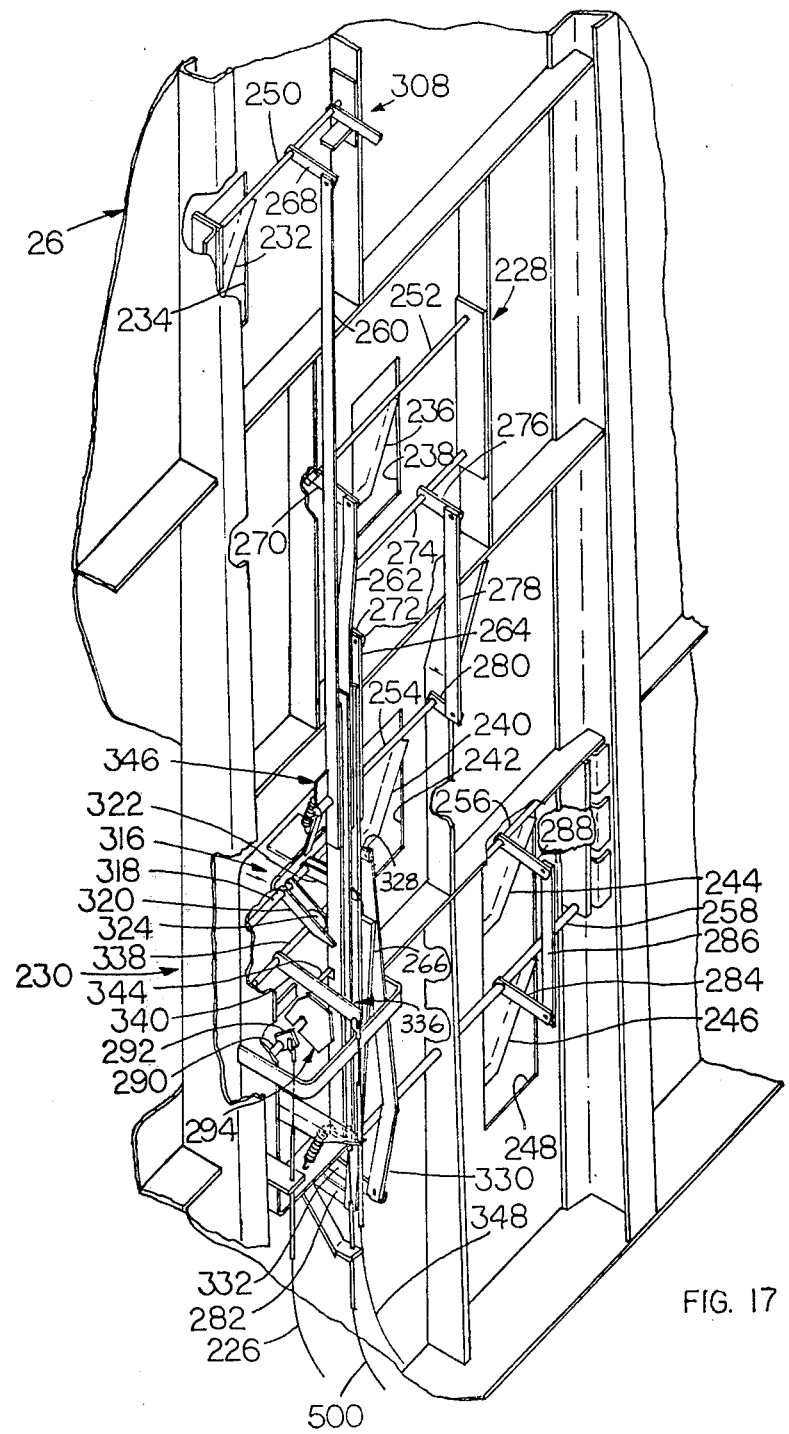
FIG. 17 is an enlarged, fragmentary perspective view of the underside of the second table of FIG. 16, as seen from below and along the right side of the bale wagon, showing the various linkage and components of the tier-forming mechanism being associated with the second table sensor paddles.

Referring now to FIGS. 16 and 17, the bale position sensing means 228 includes an arrangement of 5 sensor paddles on the second table 26.

A first sensor paddle 232 is provided projecting within a first opening 234 formed in the second table 26 generally located within the area thereof which would be covered, for example, by the right bale of a pair of bales arranged longitudinally end-to-end in a row transversely along the front end of the second table 26.

A second sensor paddle 236 is provided projecting within a second opening 238 formed in the second table 26 generally straddling the longitudinal centerline thereof and located within the area thereof which would be covered, for example, by a single bale displaced rearwardly generally one bale width from the front end of the second table 26 and longitudinally aligned in a transverse relationship across the second table 26 between a forward pair of spaced rail bales being respectively longitudinally aligned along opposite sides of the second table 26.

A third paddle 240 is provided projecting within a third opening 242 formed in the second table 26 in general alignment with the second opening 238 but located within the area of the second table 26 which would be covered, for example, by a single, centrally-located bale being displaced rearwardly generally two bale widths from the front end of the second table 26.

Fourth and fifth paddles 244, 246 are provided projecting within a fourth opening 248 formed in the second table slightly offset to the left of the second table longitudinal centerline with the fourth paddle 244 generally located within the area of the second table which would be covered, for example, by one of the rearmost bales in a tier of bales formed on the second table 26 and with the fifth paddle 246 within an area covered by one bale width forward of the load bed 52.

As seen in FIG. 17, the first through fifth paddles 232, 236, 240, 244, 246 are respectively fixed at their forward ends to shafts 250, 252, 254, 256, 258 being rotatably mounted at their opposite ends between respective pairs of spaced frame components on the underside of the second table 26.

The bale position sensing means 228 further includes four links 260, 262, 264, 266 respectively associated with the sensor paddles. Each of the links is composed of forward and rear sections being adjustably fastened together in order to allow for shortening or lengthening of the links as may be required in the initial adjustment of the links. However, for purposes of the present discussion, it may be assumed that each of the links is a unitary piece.

The forward end of the first link 260 is pivotally connected to the lower free end of an arm 268 which is fixed to, and depends generally downward from, the shaft 250 mounting the first sensor paddle 232.

The forward end of the second link 262 is pivotally connected to the lower free end of an arm 270 which is fixed to, and depends generally downward from, the shaft 252 mounting the second sensor paddle 236.

The forward end of the third link 264 is pivotally connected to the lower free end of an arm 272 which is fixed to, and depends generally downward from, a shaft 274 rotatably mounted at its opposite ends between respective pairs of spaced frame components on the second table underside and being located in the area between the second sensor paddle 236 and the third sensor paddle 240. The shaft 274 fixedly mounts a downwardly depending arm 276 which at its lower free end is pivotally coupled to the forward end of a connecting link 278. The rear end of the connecting link 278 is pivotally coupled to the lower free end of an arm 280 which is fixed to, and depends generally downward from, the shaft 254 mounting the third sensor paddle 240.

The rear end of the fourth link 266 is pivotally connected to the lower free end of an arm 282 which is fixed to, and depends generally downward from, the shaft 258 which mounts the fifth sensor paddle 246. Further, the shaft 258 fixedly mounts another downward depending arm 284 which at its lower free end is pivotally connected to the rear end of a connecting link 286. The forward end of the connecting link 286 is pivotally connected to the lower free end of an arm 288 which is fixed to, and depends generally downward from, the shaft 256 mounting the fourth sensor paddle 244, whereby the fourth and fifth sensor paddles 244, 246 are pivotally connected together so as to work as a single sensor of bales positioned within their combined areas of the second table 26.

Each of the first, second and third links 260, 262, 264 at a portion thereof located adjacent its rear end, and the fourth link 266 at a portion thereof located adjacent its forward end, is closely associated with the means 230 which receives the instruction transmitted from the cam follower 188.

Referring to FIG. 17 and, more particularly, to FIGS. 18 through 20A, the means 230 includes a shaft 290 being rotatably mounted at its opposite ends between a pair of spaced frame components on the second table underside. The shaft 290, near one of its ends, has fixed thereto a crank arm 292 which depends generally downward therefrom and has a lower free end to which is pivotally secured the other end of the push-pull cable 226 which, as mentioned hereinbefore, is pivotally secured at its one end to the cam follower 188.

The means 230 further includes a cam 294 for controlling activation of the sensor paddles 232, 236, 240 and 244 (with 246). The control cam 294 is comprised by four pairs of spaced-apart discs, generally designated as 296, 298, 300, 302 respectively, being fixedly mounted closely adjacent to one another in a row on the shaft 290. It is the cam 294 of the means 230 with which the abovementioned respective portions of the first through fourth links 260, 262, 264, 266 are closely associated, as is readily apparent in FIGS. 18 through 20A.

Turning again briefly to the links, each of the first, second and third links 260, 262, 264 extend from their respective arms 268, 270, 272, to which they are pivotally secured at their respective forward ends, longitudinally along the second table underside and in general alignment, respectively, with the spaces defined between the discs of the first, second and third pairs of discs 296, 298, 300, to their rear ends which are pivotally secured to respective springs, being generally designated overall as numeral 304, for biasing the links 260, 262, 264 in an upward direction toward the second table underside to thereby maintain the links in their desired aligned relationship, respectively, between the pairs of discs of the cam 294. The springs 304 are pivotally secured to a strip 306 fixed to the second table underside. The fourth link 266 extends from its arm 282, to which it is pivotally secured at its rear end, longitudinally along the second table underside and in general alignment with the spaced defined between the discs of the fourth pair of discs 302, to its forward end being located forwardly beyond the fourth pair of discs 302. Further, one of the springs 304, being pivotally coupled to the strip 306, is also pivotally coupled to the fourth link 266 at a point therealong generally located intermediately between its forward and rear ends and rearward from the fourth pair of discs 302 for biasing the fourth link 266 in an upward direction toward the second table underside to thereby maintain the link 266 in its desired aligned relationship between the pair of discs 302.

The springs 304 further bias the first through fourth links 260, 262, 264, 266 in a rearward direction and hold the links at respective positions in which the respective sensor paddles pivotally interconnected therewith will assume inclined positions wherein the sensor paddles extend upwardly and rearwardly through their respective openings 234, 238, 242, 248 in the second table 26 to above the bale-supporting area 24 thereof, as seen in FIG. 16. Also, suitable stop elements are associated either with the arms which pivotally connect with the links, or with other arms being fixed to the respective shafts mounting the sensor paddles, to limit the extent to which the respective springs 304 may rearwardly pull the links. One form of such stop elements being associated with the shaft 250 of the first sensor paddle 232 is shown in FIG. 17 at 308. Other of such stop elements are not shown for purpose of avoiding confusion as to the overall arrangement of the basic operative elements of the bale position sensing means 228 which have just been described. However, it may be assumed that such stop elements are present and limit rearward movement of the links to their respective positions as seen in FIGS. 17, 18, 19 and 20 and upward deflection of the sensor paddles to the respective positions shown in FIG. 16.

Figure 18:
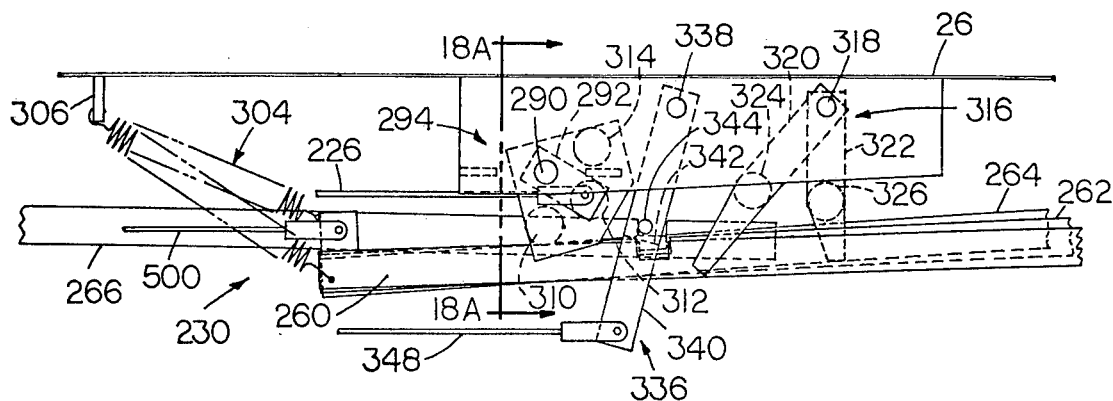
FIG. 18 is a fragmentary side elevational view, on a larger scale than that of FIG. 17, showing respective positions of the linkage and components of the tier-forming mechanism, located on the underside of the second table, for forming a standard tier pattern of bales.
Figure 19:
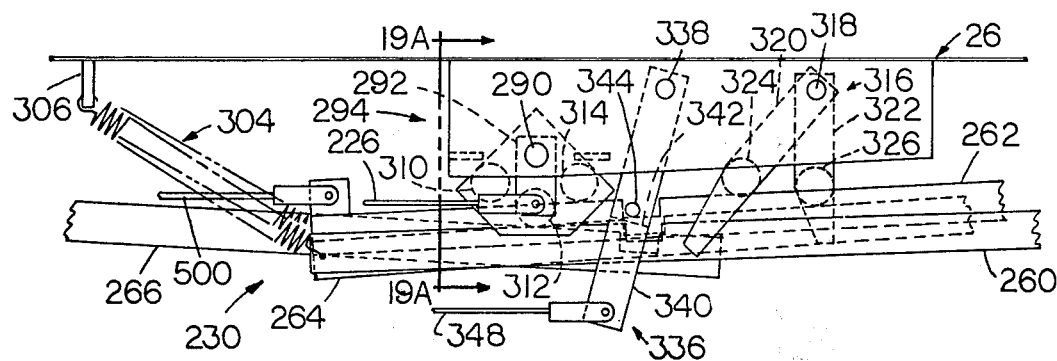
FIG. 19 is a fragmentary view elevational view similar to that of FIG. 18, but showing respective positions of the linkage and components for forming a double rail tie tier pattern of bales.
Figure 20:
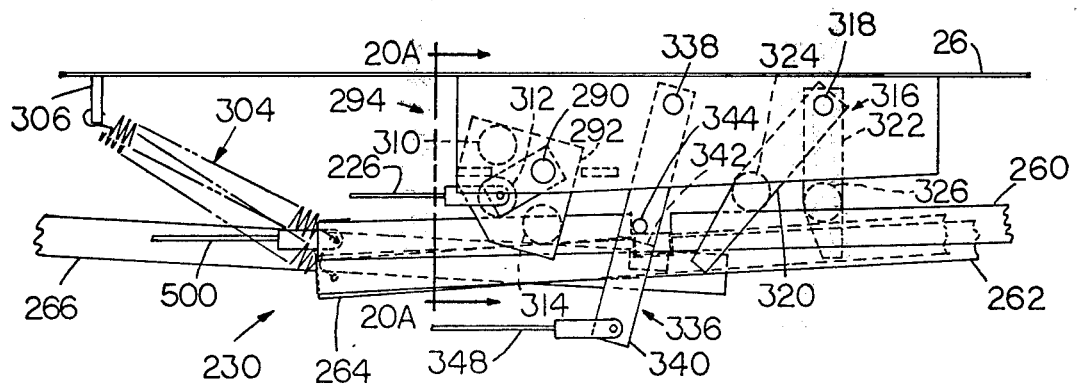
FIG. 20 is a fragmentary side elevational view similar to that of FIG. 18, showing respective positions of the linkage and components for forming a center rail tie tier pattern of bales.

Returning now to the cam 294 of the means 230, it will be noted in FIGS. 18, 19 and 20 that three series of rollers 310, 312, 314 are incorporated by the cam 294 at rear, center and front positions. Individual rollers of two of the three series are disposed in various combinations between the discs of each of the pairs of discs 296, 298, 300, 302 of the cam 294 so as to support the respective links 260, 262, 264, 266 as the links are held in their respective positions by the springs 304 in alignment between the discs of the pairs of discs.

Figure 18A:
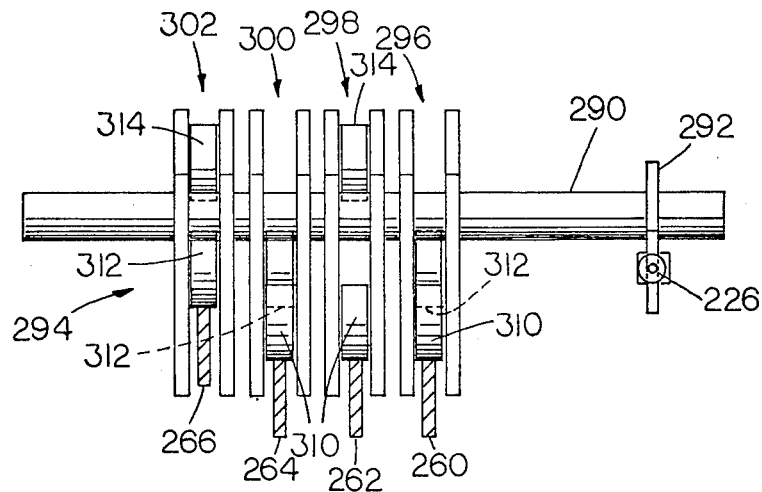
FIG. 18A is a fragmentary end elevational view taken along line 18A—18A of FIG. 18.
Figure 19A:
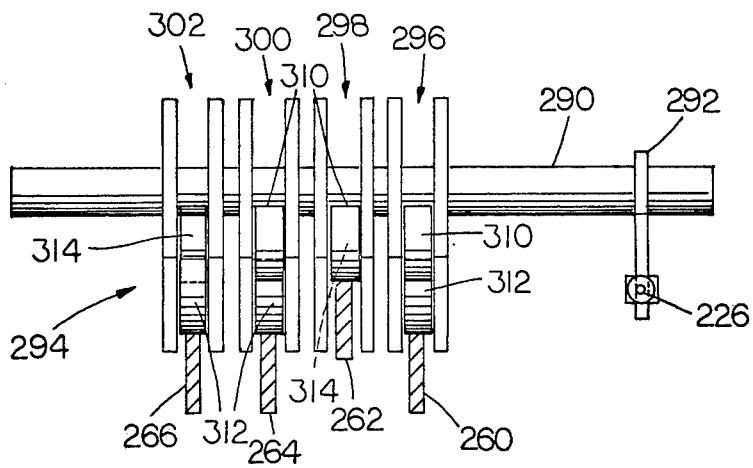
FIG. 19A is a fragmentary end elevational view taken along line 19A—19A of FIG. 19.
Figure 20A:
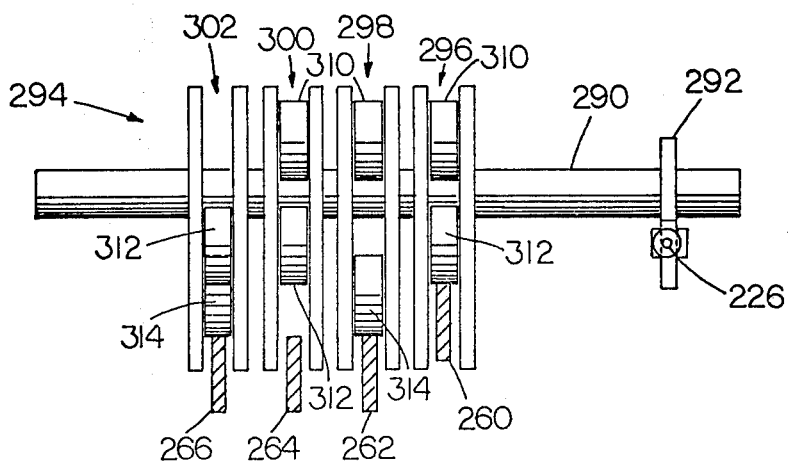
FIG. 20A is a fragmentary end elevational view taken along line 20A—20A of FIG. 20.

Specifically, as more clearly seen in FIGS. 18A, 19A and 20A, rear and center rollers 310, 312 are disposed between the discs of each of the first and third pairs of discs 296, 300, rear and front rollers 310, 314 are disposed between the second pair of discs 298, and center and front rollers 312, 314 are disposed between the fourth pair of discs 302.

The rollers when viewed as shown in FIGS. 18, 19 and 20 are spaced at equal distances from the shaft 290 of the cam 294 as well as at equal distances from each other. Therefore, if a combination of all the rollers 310, 312, 314 were located between the discs of each of the first through fourth pairs of discs 296, 298, 300, 302, rotation of the cam 294 between its three positions as shown more clearly in FIGS. 18, 19 and 20 would not affect the positions of the links 260, 262, 264, 266.

However, since rear roller 310 is the lowermost one when the cam 294 is disposed in its first rotational position of FIGS. 18 and 18A and in view of its presence between the discs of the first through third pairs of discs 296, 298, 300 and its absence from between the fourth pair of discs 302, the first through third links 260, 262, 264 are respectively maintained by rear rollers 310 of first through third pairs of discs 296, 298, 300 at a position lower than the elevated position of fourth link 266 which rests against center roller 312 of the fourth pair of discs 302.

When the cam 294 is disposed in its second rotational position of FIGS. 19 and 19A, the center roller 312 is then the lowermost one. However, in view of its absence from between the second pair of discs 298, the first, third and fourth links 260, 264, 266 are now respectively maintained by center rollers 312 of first, third and fourth pairs of discs 296, 300, 302 at a position lower than the elevated position of second link 262 which rests against the front roller 312 of the second pair of discs 298.

When the cam 294 is disposed in its third rotational position of FIGS. 20 and 20A, the front roller 314 is now the lowermost one. However, in view of its absence from between the first and third pairs of discs 296, 300, the second and fourth links 262, 266 are now respectively maintained by front rollers 314 of second and fourth pairs of discs 298, 302 at a position lower than the elevated position of first and third links 260, 264 which may respectively rest against the center rollers 312 of the first and third pairs of discs 296, 300. However, the first and third links 260, 264 are prevented from resting on center rollers 312 at the same time by a sensor paddle deactivation cam, generally indicated as 316, in FIGS. 17, 18, 19 and 20. The deactivation cam 316 includes a shaft 318 rotatably mounted at its opposite ends between a pair of the spaced frame components on the second table underside. The cam 316 is comprised by two pairs of spaced-apart arms, generally designated as 320, 322, being fixedly mounted on the shaft 318 such that one pair 320 depends downward from the shaft 318 at a small angular displacement from the generally vertical downward dependency of the other pair 322 from the shaft 318. The one pair 320 mounts a roller 324 and the other pair 322 mounts roller 326. The one pair 320 is positioned along the shaft 318 such that its roller 324 is in alignment with the first link 260, while the other pair 322 is positioned along the shaft 318 such that its roller 326 is in alignment with the third link 264.

The shaft 318, as seen in FIG. 17 has fixedly mounted thereto, and depending generally downward therefrom, an arm 328 having its lower free end pivotally connected to the forward end of a connecting link 330 which is pivotally connected at its rear end to the lower free end of an arm 332 fixedly mounted to, and depending generally downwardly from, the shaft 258 of the fifth sensor paddle 264. Therefore, the determination of which of the first and third links 260, 264 will be allowed by the deactivation cam 316 to rest against the respective center rollers 312 of the first and third pairs of discs 296, 300 of the activation cam 294, depends upon whether the fourth and fifth sensor paddles 244, 246, which act as a unit, are deflected or raised. As seen in FIGS. 17, 20 and 20A, when the sensor paddles 244, 246 are raised, roller 326 of the deactivation cam 316 holds the third link 264 at the lower position of second and fourth links 262, 266, while first link 260 assumes the more elevated position against rollers 312, 324. When the sensor paddles 244, 246 are deflected, the shaft 318 is rotated counterclockwise, as viewed in FIG. 20, which disposes arm pair 320 in the generally vertical depending position, while the arm pair 322 is angularly displaced toward the second table underside. Now, the roller 324 of the deactivation cam 316 holds the first link 260 at the lower position of second and fourth links 262, 266, while third link 264 assumes the more elevated position against rollers 312 and 326.

The sensor paddle activation cam 294 is moved between its first, second and third rotational positions, as seen respectively in FIGS. 18, 19 and 20, upon rotation of the storage cam 142, as seen in FIG. 9, so as to bring various of the lobes 146, 148, 150 into engagement with the cam follower 188. The cam follower 188 is positioned through its maximum displacement from the center of storage cam 142 when it is positioned along standard tier pattern lobe 146. Such position of the cam follower 188, in turn, via push-pull cable 226, positions the arm 292 and activation cam 294 as shown in FIGS. 18 and 18A. The cam follower 188 is positioned through its minimum displacement from the center of storage cam 142 when it is positioned along center rail tie tier pattern lobe 150. Such position of the cam follower 188, in turn, via push-pull cable 226, positions the arm 292 and activation cam 294 as shown in FIGS. 20 and 20A. The cam follower 188 is positioned through an intermediate displacement from the center of storage cam 142 when it is positioned along double rail tie tier pattern lobe 148. Such position of the cam follower 188, in turn, via push-pull cable 226, positions the arm 292 and actiavtion cam 294 as shown in FIGS. 19 and 19A.

Thus, the rotational position of the activation cam 294 is a manifestation of the instruction received by the cam follower 188 and transmitted by it via the push-pull cable 226 to the activation cam 294. In other words, the rotational position of the activation cam 294 represents the command that will be carried out by the elements of the tier-forming means to form bales into one of the standard and tie tier patterns authorized by the command.

Another of the remaining elements of the tier-forming means of the bale wagon 10 is a mechanism, generally indicated by the numeral 334 and partially illustrated in FIGS. 9, 10, 17, 18, 19 and 20, for actuating the hydraulic cylinder 42 (FIG. 1) for pivotally moving the second table 26 from its lower, horizontal position toward its upper, vertical position.

The mechanism 334 includes a second table trip, generally designated 336 in FIGS. 17, 18, 19 and 20, which is comprised by a shaft 338 rotatably mounted at its opposite ends between a pair of the spaced frame components on the second table underside, a pair of spaced lever arms 340, 342 fixed to, and depending generally downwardly from, the shaft 338, and a rod 344 interconnecting the lever arms 340, 342 and extending in a parallel, spaced relationship to the shaft 338.

The first through fourth links 260, 262, 264, 266 of the bale position sensing means each have an upper notch formed therein. The notches of the links are aligned with each other and will receive the second table trip rod 344 therethrough when the respective links are disposed at the aforementioned elevated positions. When the links are disposed at their aforementioned lower positions, their respective notches will not receive the rod 344. It is readily apparent that longitudinal movement of a link disposed in the elevated position will cause corresponding pivotal movement of the lever arms 340, 342. Such longitudinal movement occurs in a forward direction when the sensor paddle connected to such link is deflected or depressed toward the second table 26 upon being engaged by a bale and occurs in a rearward direction when the paddle is released upon being disengaged from the bale.

The sensor paddle being connected to the one of the links disposed in the elevated position is referred to as an "active" (or "sensitive") paddle since its deflection will move or pivot the second table trip 336 which, in turn, moves other components of the second table actuating mechanism 334 to cause pivoting of the second table 26, as will be explained hereinafter.

Therefore, when the cam follower 188 is on the standard tier pattern lobe 146 of the storage cam 142, the activation cam 294 is at its first rotational position, as shown in FIGS. 18 and 18A, which disposes the fourth link 266 at the elevated position with its notch receiving the second table trip rod 344 and thereby renders active the fourth and fifth sensor paddles 244, 246, and which also disposes the first, second and third links 260, 262, 264 at the lower position with their notches removed out of alignment with the rod 344 and thereby deactivates the first, second and third sensor paddles 232, 236, 240.

When the cam follower 188 on the double rail tie tier pattern lobe 148 of the storage cam 142, the activation cam 294 is at its second rotational position, as shown in FIGS. 19 and 19A, which disposes the second link 262 at the elevated position with its notch receiving the second table trip rod 344 and thereby renders active the second sensor paddle 236, and which also disposes the first, third and fourth links 260, 264, 266 at the lower position with their notches removed out of alignment with the rod 344 and thereby deactivates the first, third, fourth and fifth sensor paddles 232, 240, 244, 246.

When the cam follower 188 is on the center rail tie tier pattern lobe 150 of the storage cam 142, the activation cam 294 is at its third rotational position, as shown in FIGS. 20 and 20A, which alternately disposes one of the first and third links 260, 264 at the elevated position and thereby alternately renders active one of the first and third sensor paddles 232, 240, and which also disposes the second and fourth links 262, 266 at the lower position with their notches removed out of alignment with the rod 344 and thereby deactivates the second, fourth and fifth sensor paddles 236, 244, 246. As seen in FIG. 20, when the activation cam 294 is at its third rotational position, initially the first link 260 is disposed at the elevated position and the third link 264 is disposed at the lower position by roller 326 of the deactivation cam 316. When the cam 316 is rotated counterclockwise upon depression of the fourth and fifth sensor paddles 244, 246, the first link 260 is moved to the lower position and the third link 264 is allowed to assume the elevated position and thereby the third sensor paddle 240 is rendered active and the first sensor paddle 232 is deactivated.

In the initial situation just referred to above wherein the first sensor paddle 232 is rendered active, when the first sensor paddle 232 is deflected or depressed by receipt of two bales on the front end of the second table 26, as will be explained in greater detail hereinafter the second table 26 is pivoted upwardly until the bales reach the rear end of the table and depress the fourth and fifth sensor paddles 244, 246. Then, the second table returns to its lower position. However, some means must be provided to maintain the first sensor paddle 232 in its depressed condition after the second table begins to pivot upwardly and the bales begin to slide rearwardly off the first paddle 232 and toward the rear end of the table, otherwise return of the first paddle 232 to its normal inclined, raised position as soon as the bales slide away therefrom would cause the second table 26 to return to its lower position before the bales reached the rear end of the table. Means in the form of a latch 346 mounted on the first link 260, as shown in FIG. 17, will hold the link 260 in the forward position it assumed when the first sensor paddle 232 was depressed and thus will hold the paddle 232 in its depressed position until the bales reach the rear end of the second table 26 and downwardly deflect the fourth and fifth sensor paddles 244, 246. As explained above, deflection of the fourth and fifth paddles 244, 246, via the deactivation cam 316, elevates the third link 264 and lowers the first link 260. Lowering of the first link 260, as has been explained, deactivates the first sensor paddle 232. It also allows the latch 346 to unlatch which allows the first link 260 to move rearwardly and the first sensor paddle 232, although now being deactivated, to return to its raised, inclined position.

The second table actuating mechanism 334 further includes a push-pull cable 348 being pivotally connected at one end to the free end of the lever arm 340 of the second table trip 336, as seen in FIGS. 17, 18, 19 and 20, and at its other end to linkage, generally designated 350, associated with a second table hydraulic valve 352, as seen in FIGS. 9 and 10, which controls the flow of hydraulic fluid to the second table hydraulic cylinder 42.

When one of the sensor paddles on the second table 26 is depressed by a bale, its associated one of the links is moved in a forward direction. The second table trip rod 344, being received through the notch of such one associated link, is carried forward which causes the second table trip lever arms 340, 342 to be pivotally moved forward. The forward movement of lever arm 340 is transmitted by the push-pull cable 348 to the second table valve linkage 350 as a rearwardly-directed pull.

The second table valve linkage 350 includes a first pivotal assembly, generally designated 354, having an arm 356 being pivotally mounted at its lower end to a cylindrical stud 358 projecting outwardly from left longitudinal rail 14 and being pivotally connected at its intermediate section to the other end of the push-pull cable 348. The first pivotal assembly 354 further has a latch 360 pivotally connected to the upper free end of the arm 356 and biased by a spring 362 to pivot counterclockwise toward the arm 356. The latch 360 has a forward portion 364 defining a rearwardly facing shoulder which will engage and latch with an upper ledge portion 366 fixed on a second pivotal assembly 368 being pivotally mounted at its lower end to the stud 358 and located adjacent, and outwardly from, the arm 354 of the first pivotal assembly 354.

The second pivotal assembly 368 further has a vertical slot 370 defined therein which receives therethrough a link 372 being connected at a forward end to a spool 374 of the second table valve 352. A spring 376 is connected between a support 378 for the valve 352 and the second pivotal assembly 368 which biases the assembly 368 in a forward direction. A washer 380 is attached on the link 372 at a location spaced from the rearward side of the assembly 368 and a spring 382 is disposed about the link 372 between the washer 380 and the assembly 368.

The rearwardly-directed pull transmitted to the first pivotal assembly by the push-pull cable 348 pivots the arm 356 clockwise and moves the latch 360 rearward. Rearward movement of the latch 360 causes the second pivotal assembly 368 to pivot clockwise and compress spring 382 against the link washer 380 until finally the link 372 is moved in a rearward direction which also shifts the valve spool 374 to a rear (or "out") position. At its rear position, the valve spool 374 allows hydraulic fluid under pressure to flow into the second table hydraulic cylinder 42 which causes it to extend and pivotally move the second table 26 from its lower position toward its upper position.

Fluid will continue to flow into the second table hydraulic cylinder 42 and cause upward pivotal movement of the second table 26 until the valve spool 374 is returned to its forward (or "in") position which allows return flow of fluid from the second table cylinder 42 and thereby causes the second table 26 to return back to its initial, lower position. The valve spool 374 may be returned to its forward position either as a result of the unlatching of latch 360 by actuation of a second table return trip, generally designated 384 in FIGS. 9 and 10, when the table 26 reaches its generally vertical, upper position adjacent the front end of the load bed 52, or as a result of relaxation of the pull on the arm 356 of the first pivotal assembly 354 by the push-pull cable 348 prior to when the second table 26 has reached its upper position.

The latter result occurs during the initial steps in the formation of bales into the double rail and center rail tie tier patterns, as will be explained hereinafter, when second table 26 pivots toward its upper position. As table 26 reaches a sufficiently inclined position, a bale, which initially depressed the one active sensor paddle, slides rearwardly along table 26 and off the paddle, whereupon the paddle returns to its raised position due to the return pull of the spring attached to the rear end of the one link connected to that paddle. Rearward return movement of the link moves trip rod 344 rearward. Such rearward movement of trip rod 344 is transmitted via trip lever arm 340 and push-pull cable 348 to the first pivotal assembly 354 which allows latch 360 to move to its forward position, in turn, allowing second pivotal assembly 368 to be moved to its forward position by the bias in spring 376, which causes return of valve spool 374 to its forward position.

The second table return trip 384, when actuated, unlatches the forward portion 364 of latch 360 from the upper ledge portion 366 of the second pivotal assembly 368 and thereby allows the assembly 368 to pivot in a forward direction back to its initial position due to return spring 376. As the assembly 368 moves forward, it will carry with it the link 372 due to engagement by the assembly 368 with a cotter pin (not shown) being located on the link 372 on the forward side of the assembly 368. Also, the first pivotal assembly 354 and its latch 360 will subsequently return to its initial forward position due to a return spring 386 being connected therewith and relatch with the assembly 368, once the second table 26 beings to fall downwardly away from the tier of bales it has just deposited on the load bed 52 and the respective paddle returns to its raised position.

The second table return trip 384 includes a transverse shaft 388 being rotatably mounted at its opposite right and left ends by brackets 390 (only the right one being shown in FIGS. 9 and 10) fixed respectively to the transverse frame member 156 and left longitudinal rail 14. An arm 392 is fixed to the shaft 388 near its right end and extends upwardly and rearwardly therefrom. A spring 394 is connected between the arm 392 and the right bracket 390, biasing the arm 392 and thus the shaft toward counterclockwise rotation, as seen in FIG. 9; however, one end of a flat piece 396 fixed to the shaft 388 near its left end engages the top of the left rail 14 to limit such rotation of the shaft 388.

The trip 384 also includes a generally J-shaped arm 398 pivotally mounted at its lower end to support assembly 154 for the storage cam 142 and cable drum 158. A link rod 400 interconnects the arm 392 of shaft 388 with the J-shaped arm 398. As the second table 26 reaches its upper position, as seen in FIG. 9, it brings a U-shaped rod 402, fixed to, and depending from, the arm portion 46 thereof, into engagement with the upper end of the J-shaped arm 398 and causes a slight amount of clockwise rotation of the arm 398 which, in turn, rotates the shaft 388 via the link rod 400 and arm 392.

Referring now to FIG. 10, it is seen that such rotation of the shaft 388 (appearing in a counterclockwise sense in FIG. 10) pivotally moves a plate 404, being fixed near the left end of shaft 388, upwardly such that an outwardly protruding stud 406 fixed to the plate 404 lifts the latch 360 at its forward portion 364 to an elevated position in which the rear-facing shoulder of the portion 364 is clear of the upper ledge portion 366 of the second pivotal assembly 368 which thereby unlatches the assembly 368 and allows it to pivot in a forward direction back to its initial position due to its return spring 376. As explained hereinbefore, such movement of the assembly 368 shifts the second table valve spool 374 back to its forward position, which causes the second table 26 to return back to its initial, lower position.

Still another of the remaining elements of the tier-forming means of the bale wagon 10 is the tie spike mechanism 50, already briefly mentioned hereinbefore, shown in FIGS. 1 and 3 and other means associated therewith for controlling its actuation, being partially shown in FIGS. 9, 17, 18, 19, 20, 21 and 22. The mechanism 50, being generally similar to that illustrated and described in aforementioned U.S. Pat. No. 3,395,814, facilitates the rearrangement of a pair of bales, initially disposed end-to-end in a row transversely along the forward end of the second table 26, into side rail positions in which the bales are separated from each other and respectively disposed longitudinally along opposite sides of the second table 26 adjacent the forward end thereof.

Referring to FIG. 3, the tie spike mechanism 50 includes an elongated shaft 408 rotatably mounted through the outer free ends of a series of four support strips 410 being fixed at their inner ends to a transverse support member 412 at spaced locations therealong and extending in a rearward direction therefrom. The transverse support member 412, as mentioned hereinbefore, is fixed on the front brackets 48 and supports the forward end of the second table 26 (being shown in outline form in FIG. 3) when it is at its normal, lower horizontal tier-forming position.

Also, U-shaped support brackets 414 are fixed to the transverse support member 412 respectively adjacent its opposite ends and extend first rearwardly and then inclined upwardly and rearwardly therefrom. A shaft 416 is rotatably mounted transversely across the upper end portions of each of the U-shaped brackets 414 and has a bore 418 defined therethrough generally perpendicular to the longitudinal axis thereof. A crank arm 420 is fixed at each opposite end of the elongated shaft 408, being located between the sides of each U-shaped support bracket 414, and extends generally perpendicular to the longitudinal axis of the shaft 408. The outer end of each crank arm 420 pivotally mounts a cylindrical spike 422 having a pointed upper end and being received through a respective one of the bores 418 in shafts 416.

Means are provided in the form of a hydraulic cylinder 424 for rotating the elongated shaft 408 and, thus, for raising the spikes 422. Retraction of the hydraulic cylinder 424 raises the spikes 422 from the lower, retracted position, as shown in FIG. 3, in which the spikes 422 are aligned respectively with holes 426 defined in the second table 26 adjacent its opposite forward corners, to an upper, elevated position in which the spikes 422 will extend upwardly and generally vertically through the holes 426. Preferably, the spikes 422 are positioned such that when the spikes are elevated with a pair of bales resting end-to-end transversely along the forward end of the second table 26, the spikes 422 will penetrate the respective bales approximately 6 to 8 inches inwardly from their outer end sides. The anchor end of the hydraulic cylinder 424 is pivotally secured to an upstanding brace 428 fixed on left longitudinal rail 14 and the piston rod end of the cylinder 424 is pivotally secured to the free end of another crank arm 430 fixed along, and generally perpendicular to, the elongated shaft 408.

Means, generally indicated by numeral 432, for controlling actuation of the hydraulic cylinder 424 for the tie spike mechanism 50 is partially shown in each of FIGS. 9 and 17 through 22. The control means 432 includes a first pivotal assembly, generally designated as 434, and a second pivotal assembly, generally designated as 436, both being illustrated in FIGS. 21 and 22.

The first pivotal assembly 434 includes a shaft 438 rotatably mounted through the spaced, rearwardly-extending opposite ends of a U-shaped bracket 440 fixed to the rear side and right end of an angled support plate 442 being fixed between the front brackets 48 on rails 14 rearward from, and generally below, the transverse support member 412 of FIG. 3. Short and long arms 444, 446 are fixed to, and depend downwardly from, the respective opposite left and right ends of the shaft 438. At the lower end of a short arm 444 is fixed the rear end of a cam follower arm 448 which extends first forwardly and then inclined downwardly and forwardly from the short arm 444 to adjacent the lower end of a cam 450 attached to the upper rear side of the right upwardly extending leg portion 78 of the first table 22. A cam follower roller 452 rotatably mounted on the forward end of the arm 448 engages the surface of the arm 450 at the lower end thereof. The lower end of the long arm 446 is pivotally secured to a link 454 at an intermediate location therealong between its ends. The link 454 is coupled at a rear one of its ends of the spool 456 of a hydraulic valve 458 for the tie spike mechanism 50 being mounted on a support 460 fixed to the right longitudinal rail 14. The other end of the link 454 is associated with the second pivotal assembly 436, which will be described now.

The second pivotal assembly 436 includes a trip member 462 having a rearwardly-extending, upper angled portion 464 and a downwardly-extending leg portion 466 which depends from the front end of the upper portion 464 and is pivotally secured at its upper end to a upstanding bracket 468 mounted at the right end of the angled support plate 442, as seen in FIG. 22. The lower end of the trip member leg portion 466 is pivotally secured to the upper ends of a pair of vertical members 470, 472. The right member 470 slants outwardly and downwardly for a short distance and then generally downward and parallel to the left, downwardly-extending member 472. The two members 470, 472 are pivotally secured at their lower ends about a common axis by suitably fixed means (not shown) mounted to the right rail 14.

Intermediately along is length, the right member 470 has fixed thereto a vertically-slotted washer 474 which receives the link 454 therethrough. The link 454 has another washer 476 fixed at its front end with a spring 478 extending about the link 454 between slotted washer 474 and end washer 476. A stop element 480 is also formed on the link 454 adjacent the rear side of the member 470.

Intermediately along its length, the left member 472 has also fixed thereto a vertically-slotted washer 482 which receives a link 484 therethrough. The link 484 is coupled at a rear one of its ends to the spool 120 of the first table delay valve 118, mentioned hereinbefore. The link 484 has another washer 486 fixed at its front end with a spring 488 extending about the link 484 between slotted washer 482 and end washed 476. A stop element 490 is also formed on the link 484 adjacent the rear side of the member 472. Further, two springs 492 are respectively secured between the support 460 and the members 470, 472, only the right spring associated with member 470 being shown in FIG. 22. As mentioned above, the first table delay valve 118 does not represent an essential feature of the improvements incorporated in the bale wagon 10 and thus the valve 118, and the member 472 and link 484 associated therewith, need not be discussed further.

Referring to FIG. 22, the second pivotal assembly 436 is disposed in the solid line position depicted, when the second table 26 has been lifted off the trip member 462. The assembly 436 is disposed in the broken line position when the second table 26 is at its lower position in which it has deflected the trip member 462 downwardly and counterclockwise, as seen in FIG. 22. Further, as seen in FIG. 22, the spool 456 of the tie spike mechanism valve 458 is initially disposed in a "centered" or neutral position when the first table 22 (not shown) is at its horizontal position. Even though the pivotal deflection of the trip member 462 causes the member 470 to pivot forward and clockwise and compress spring 478 against link washer 476, the link 454 is prevented from being carried forward by the compressed spring 478 due to engagement of the cam follower roller 452 with the first table cam 450 and the rigid connection between the cam follower arm 448, short arm 444, shaft 438 and long arm 446 which is coupled to link 454. However, when the first table 22 is actuated and as it reaches its upper position, the cam 450 moves free of the roller 452 which allows forward, counterclockwise pivoting of the first pivotal assembly 434 due to forward movement of the link 454 as caused by extension of compressed spring 478. Such forward movement of link 454 pulls the spool 456 to an out or forward position which allows hydraulic fluid to flow to the cylinder 424 and cause its actuation. Return of the first table 22 to its lower position moves its cam 450 back into engagement with cam follower roller 452 which shifts spool 456 back to its centered position. Such actuation raises the tie spikes 422 through the bores 418 of shafts 416 and through openings 426 in the front end of the second table 26. Thus, when the second table 26 is at its lower position, each pivotal cycling of the first table 22 from its lower position to its upper position and back to its lower position would result in shifting of the tie spike mechanism valve spool 456 from its centered position to its forward position and back to its centered position and, thereby, raising of the spikes 422 to their elevated position.

However, other elements are provided by the means 432 which will prevent the aforementioned result from occurring during formation of bales into the standard tier pattern and which will further only allow its occurrence at desired periods during formation of bales into the two tie tier patterns.

Such other elements include a lever arm 494, shown in FIG. 9, being pivotally mounted to support assembly 154 in a coaxial relationship with, and spaced relationship above, the cam follower arm 222. The lever arm 494 is interconnected at one of its ends to the short arm 444 of the first pivotal assembly 434 by a connecting rod 496. Therefore, forward pivotal movement of the first assembly 434, due to movement of the first table cam 450 free of first table cam follower roller 452 as the first table 22 reaches its upper position, would cause counterclockwise pivotal movement of lever arm 494 toward the center of storage cam 142.

However, the provision of a lug 498 fixed to the forward side of lever arm 494 and depending therefrom past storage cam follower arm 222 will prevent such counterclockwise pivotal movement of the lever arm 494 toward the storage cam center and relative to the storage cam follower arm 222 when the storage cam follower roller 188 is located along any of lobes 146 on the storage cam 142. Thus, during formation of the standard tier pattern, which corresponds to first lobe 146, the tie spike valve spool 456 is prevented from shifting from its centered to its forward position, and thus the tie spikes 422 from their retracted to their raised positions, each time the first table 22 is cycled. However, when the storage cam follower roller 188 is located along any of lobes 148, 150 on the storage cam 142, such as during formation of the double rail tie tier pattern and center rail tie tier pattern, respectively, the lever arm 494 is free to pivot counterclockwise toward the storage cam center through a distance sufficient to allow shifting of the tie spike valve spool 456 from its centered to its forward position before the depending lug 498 on the lever arm 494 engages the storage cam follower arm 222.

Retraction of the tie spikes 422, through shifting of the tie spike valve spool 456, occurs in either one of two ways, by the second table 26 being cycled upward or by depression of the second sensor paddle 236 on the second table 26.

In FIG. 22, it will be noted that as the second table 26 is lifted, the trip member 462 of the second assembly 436 is released and the spring 492 causes the member 470 of the second pivotal assembly 436 to pivot counterclockwise and rearwardly and against stop element 480 or link 454 which carries the link 454 rearwardly also and thereby pushes the tie spike valve spool 456 from its centered to an in or rearward position which allows retraction of tie spikes 422. Once the second table returns to its lower position, the valve spool 456 is shifted back to its centered position.

Referring now to FIGS. 17 through 20, there is shown a push-pull cable 500 pivotally secured at one of its ends to the rear end of the second link 262, which is pivotally connected to second sensor paddle 236, and at its other end to the opposite end of the lever arm 494, as seen in FIG. 9.

It will be recalled that the ability of the second sensor paddle 236 to actuate the second table trip rod 344, and thereby cycle the second table 26, depends upon whether the second link 262 is disposed in the elevated position with its notch receiving the trip rod 344. If the second link 262 is in such position, the second paddle 236 is rendered "active"; otherwise, if the link 262 is in the lower position, the paddle 236 is deactivated or inactive. However, with respect to the ability of the second sensor paddle 236 to actuate the tie spike mechanism 50 so as to cause retraction of the tie spikes 422, the position of the second link 262 with respect to trip rod 344 is not a controlling factor. The second paddle 236 is always active with respect to its ability to cause retraction of the tie spikes 422.

Each time a bale depresses the second sensor paddle 236, the second link 262 is moved for a short distance in a forward direction which pulls the push-pull cable 500 forward. The forward movement of the cable 500, in turn, pivots the lever arm 494 clockwise, as seen in FIG. 9. It should be noted that lever arm 494 is free to pivot clockwise or away from the storage cam center since the lug 498 carried by the arm 494 is moved away from the storage cam follower arm 222. Clockwise pivoting of lever arm 494 pulls the connecting rod 496 in a rearward direction. The connecting rod rearward movement, in turn, via its pivotal securement to short arm 444, pivots the second pivotal assembly 434 clockwise and rearwardly which pulls link 454 rearward and pushes in tie spike valve spool 456 from its centered position to its in or rearward position. If the tie spikes 422 happened to be at their raised position, they will now pivot to their retracted position. Then, once the bale is removed from the second sensor paddle 236, it will return to its raised position due to spring 304 pulling the second link 262 rearwardly. This, in turn, pushes the cable 500 rearward, pivots lever arm 494 counterclockwise, pushes connecting rod 496 in a forward direction, and pivots the second pivotal assembly 434 counterclockwise which returns the tie spike valve spool 456 to its centered position.

It should be mentioned that the aforementioned means which operate to raise and retract the tie spikes 422 also simultaneously raise and retract the intermediate or single bale trip arm 121 of FIG. 3, since the hydraulic cylinder (not shown) for actuating the trip arm 121 is hydraulic coupled to the tie spike mechanism hydraulic cylinder 424.

THREE MODES OF OPERATION OF MEANS FOR TIER PATTERN FORMATION

As explained hereinabove, the one of the three tier patterns into which bales will be formed is selected or determined according to the one of the lobes 146, 148, 150 of the storage cam 142 along which the storage cam follower 188 is located. Thus, in other words, the one of the three possible modes, which correspond respectively to the three tier patterns, in which the above-described tier-forming means will operate at any given time is selected or determined by the lobe location of the storage cam follower 188.

When the storage cam follower 188 is located along one of lobes 146, the tier-forming means will operate in a first mode to form bales into the standard tier pattern of FIGS. 23 and 24.

Whether the bales in the standard tier pattern will be resting on their edge or flat sides on the second table 26 depends upon which mode of operation of the first table 22 is selected. The mechanical trips and linkages associated with the load bed 52 and the second table 26 for shifting the selector valve spool 104 of the first table selector valve 102 between its out and in postions, respectively, for selecting one of the two modes of operation for the first table 22, will be described in detail after the three modes of operation of the tier-forming means has been described.

With the storage cam follower 188 so located for operation of the tier-forming means in its first mode, the activation cam 294 assumes its first rotational position of FIGS. 18 and 18A in which it holds the first, second and third links 260, 262, 264 in their lower position which deactivates the first, second and third sensor paddles 232, 236, 240 and allows the fourth link 266 to assume the elevated position, shown in FIG. 18A, due to the rearward and upward pull of its associated one of the springs 304 which activates the interconnected fourth and fifth sensor paddles 244, 246 for sensing bale position.

Further, with the storage cam follower 188 so located, it prevents counterclockwise pivotal rotation of lever arm 494 toward the storage cam center which, in turn, prevents shifting of the tie spike valve spool 456 between its centered and forward position, as the first table 22 is cycled to successively deliver pairs of bales to the forward end of the second table 26. Thus, the tie spikes 422 are maintained in an initial retracted position below the second table forward end during formation of the standard tier pattern of bales.

Thus, the first mode of operation of the tier-forming means generally simulates the manner in which bales have heretofore been formed into a standard tier pattern on previous Grey bale wagons. The first bale of successive pairs of bales, being received on the first table 22 and arranged end-to-end in a row on their flat sides, engages and moves the outer trip arm 123 which causes successive pivotal cycling of the first table 22 to its upper position and thereafter return to its lower position and thereby successive delivery of pairs of bales to the forward end of the second table 26. As each successive pair is delivered, it pushes the pairs accumulated in successive transverse alignments across the second table in a rearward direction. Delivery of pairs of bales continues until the rearmost pair of the tier being formed engages and depresses the fourth sensor paddle 244. Depression of the fourth paddle 244 trips the second table actuating mechanism 344, in a manner heretofore described, and causes pivoting of the second table 26 to its upper position and delivery of the standard tier pattern of bales to the load bed 52. The fourth paddle 244 is spaced from the forward end of the second table 26 such that either four transverse rows of bales resting on their flat sides or five transverse rows of bales resting on their edge sides must be accumulated on the second table 26 in order for the rearmost row to engage and depress the fourth paddle 244.

It should be noted that as the pairs or rows of bales accumulate on the second table 26 and are moved rearwardly therealong as more pairs are delivered to its forward end, the second sensor paddle 236 is depressed which, in a manner explained hereinbefore, causes the tie spike valve spool 456 to shift from its centered to its rearward position. However, since the tie spikes 422 were already retracted when the spool 456 was in its centered position, its movement to the rearward position has no effect. Also, when the second table 26 is lifted to deliver the completed standard tier pattern of bales to the load bed, the trip member 462 of the tie spike control means 482 is released which has the effect of shifting valve spool 456 to its rearward position. Then, when the second table 26 lowers back to its horizontal position, after delivering the completed tier to the load bed 52, the trip member 462 is deflected downwardly which has the effect of shifting the valve spool 456 back to its centered position with the tie spikes 422 still being maintained in their retracted position at the start of the next tier-forming operation on the second table 26.

Figure 25:
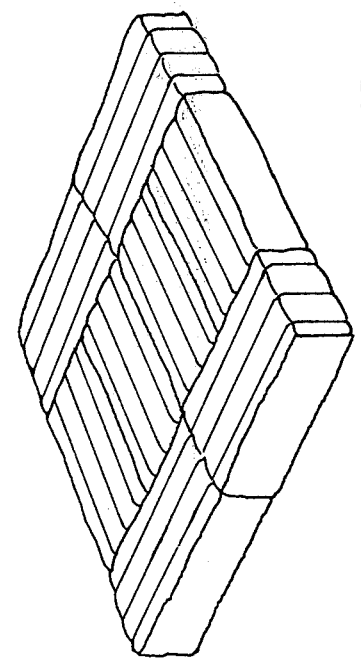

When the storage cam follower 188 is located along one of the lobes 148, the tier-forming means will operate in a second mode to form bales into the double rail tie tier pattern of FIG. 25.

With the storage cam follower 188 so located for operation of the tier-forming means in its second mode, the activation cam 294 assumes its second rotational position of FIGS. 19 and 19A in which it holds the first, third and fourth links 260, 264, 266 in their lower position which deactivates the first, third, and interconnected fourth and fifth sensor paddles 232, 240, 244, 246 and allows the second link 262 to assume the elevated position, shown in FIG. 19A, due to the rearward and upward pull of its associated one of the springs 304 which activates the second sensor paddle 236 for sensing bale position.

Also, with the storage cam follower 188 so located along one of the lobes 148, it will allow counterclockwise pivotal rotation of lever arm 494 toward the storage cam center which, in turn, will allow shifting of the tie spike valve spool 456 between its centered and forward positions, as the first table 22 is cycled to successively deliver one or two bales to the forward end of the second table 26. Thus, the tie spikes 422 may be raised from their initial retracted position to their elevated position and maintained at such position after delivery of the first pair of bales in the initial step of forming the double rail tie tier pattern of bales.

Figure 27:
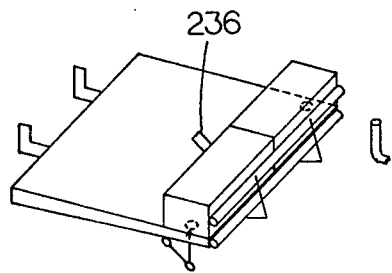
FIGS. 27 to 32 are perspective schematic representations of the initial steps in the formation of bales into the double rail tie tier pattern of FIG. 25.
Figure 36:
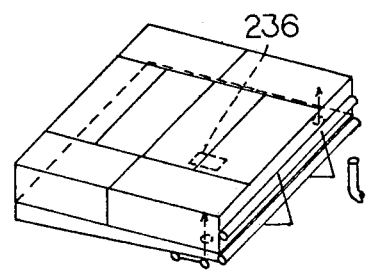
Figure 37:
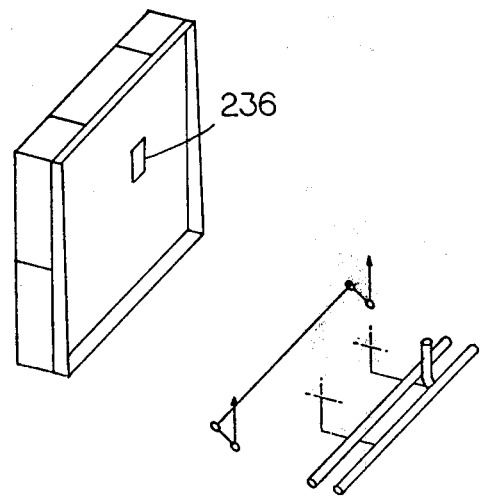

FIGS. 27 through 37 schematically illustrate the steps involved in the formation of bales into the double rail tie tier pattern of FIG. 25, beginning with the initial delivery of a row of bales onto the forward end of the second table, as shown in FIG. 27, and ending with delivery of the completed tier to the load bed, as depicted in FIG. 37.

Figure 28:
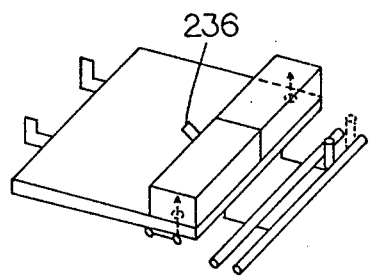

As just mentioned, initial cycling of the first table to deliver the first pair of bales, as shown in FIG. 27, raises the tie spikes, being represented by the pair of arrows in FIG. 28, such that they penetrate the bales adjacent their respective outer ends. Also, as mentioned hereinbefore, whenever the spikes are raised, the intermediate or single bale trip arm is also raised to its operative position, whereby, now, receipt of a single bale by the first table will engage this trip arm and cause the first table to cycle and deliver the bale to the second table forward end.

Figure 29:
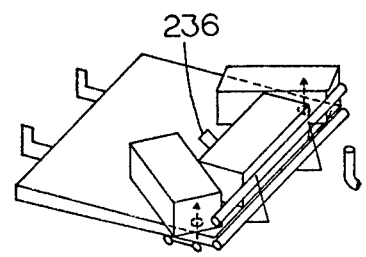

Since the two bales already positioned on the second table forward end are, in effect, pivotally secured at their respective outer ends to the second table by the tie spikes, delivery of the single bale to the center of the forward end of the second table pushes the respective inner ends of the two bales rearwardly and partially toward rail positions at the respective opposite sides of the second table, as seen in FIG. 29.

At the start of the next first table cycle, the tie spikes and single bale trip still remain at their elevated positions since, up to this stage in the second mode of operation of the tier-forming means, neither depression of the second sensor paddle 236 or actuation of the second table has occurred.

Figure 30:
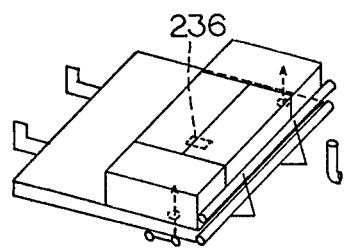
Figure 31:
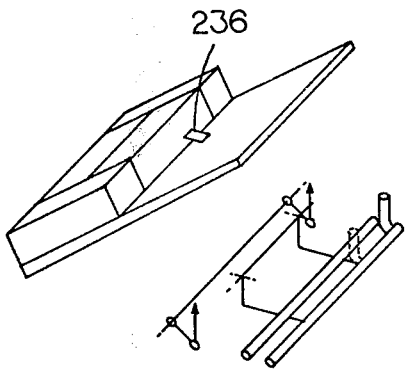
Figure 32:
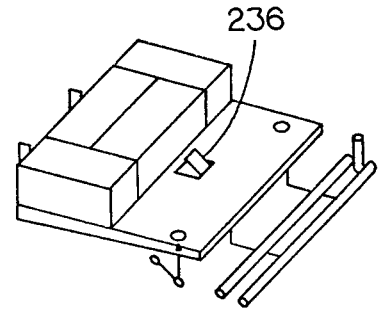
Figure 33:
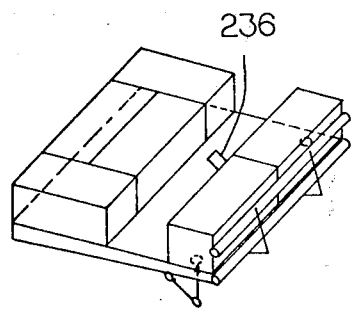
FIGS. 33 to 37 are perspective schematic representations of the remaining steps in the formation of bales into the double rail tie tier pattern of FIG. 25.
Figure 34:
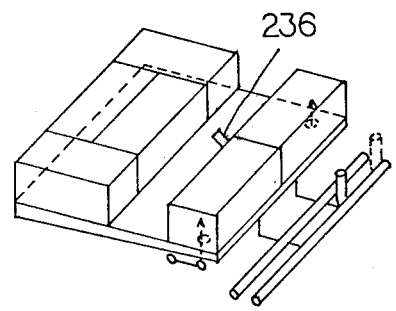
Figure 35:
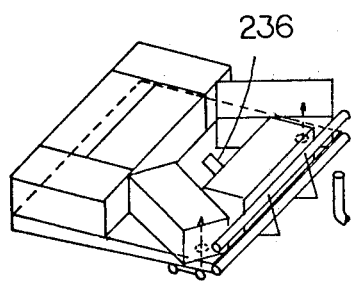

Again, the first table cycles upon receiving a single bale and pushes the bale onto the second table and into the single bale already positioned there such that the latter single bale is moved rearwardly onto the second sensor paddle 236 which causes its depression and the two partially pivoted bales are moved completely to their rail positions, as seen in FIG. 30. Since the second paddle 236 is the one that is active, its depression causes the second table actuating mechanism 334 (FIGS. 9, 10 and 17 through 20) to shift the second table valve spool 374 to its rearward position and thereby cause actuation of the second table pivotal cycle toward its upper position, as well as retraction of the tie spikes which the second paddle would cause regardless of whether it is active or not. As the second table pivots upwardly, it soon reaches an angle of incline at which the partially formed tier of bales slide to the rear half of the second table, as seen in FIG. 31. Once the bales have slid past, and are clear of the second paddle 236, the one of the springs 304 associated with the second link 262 pulls it rearwardly, raising the second paddle 236 and causing the second table actuating mechanism 334 to shift the second table valve spool 374 back to its forward position and thereby cause the second table to return back to its lower position, as seen in FIG. 32.

The steps described above and illustrated in FIGS. 27 through 30 are repeated to complete formation of the bales into the double rail tie tier pattern of FIG. 25. However, this time, upon delivery of the last single bale to the second table, as seen in FIG. 36, the next centrally-positioned single bale, which is pushed rearwardly by the last single bale and depresses the paddle 236, remains positioned upon it until the second table reaches its upper position, as seen in FIG. 37, at which point the second table return trip 384 causes the second table actuating mechanism 334 to shift the second table valve spool 374 back to its forward position and thereby cause the second table to return back to its lower position.

Figure 26:
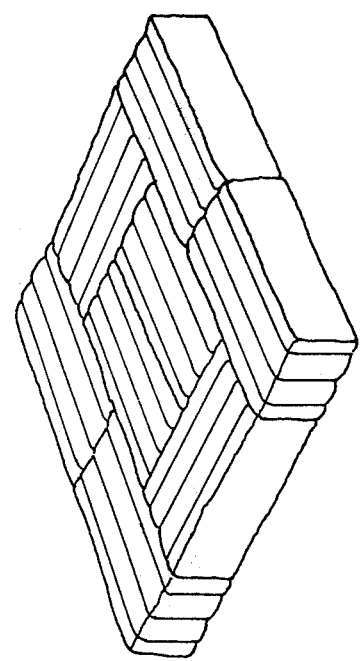

Finally, when the storage cam follower 188 is located along the lobe 150, the tier-forming means will operate in a third mode to form bales into the center rail tie tier pattern of FIG. 26.

With the storage cam follower 188 so located for operation of the tier-forming means in its third mode, the activation cam 294 assumes its third rotational position of FIGS. 20 and 20A in which it holds the second and fourth links 262, 266 in their lower position, deactivates the second are interconnected fourth and fifth sensor paddles 236, 244, 246 and allows the first and third links 260, 264 to assume the elevated position, with first link 260, as shown in FIG. 20A, initially assuming such position due to the rearward and upward pull of its associated one of the springs 304 which activates the first sensor paddle 232 for sensing bale position. As explained hereinbefore, a deactivation cam 316, pivotally interconnected with the fourth and fifth paddles 244, 246, prevents the first and third links 260, 264 from assuming the elevated position at the same time. When the paddles 244, 246 are raised, the deactivation cam 316 retains third link 264 at the lower position; and when the paddles 244, 246 are depressed, the first link 260 is retained at the lower position, with the third link 264 allowed to assume the elevated position.

Also, with the storage cam follower 188 being located along the lobe 150, it will allow counterclockwise pivotal rotation of lever arm 494 toward the storage cam center which, in turn, will allow shifting of the tie spike valve spool 456 between its centered and forward positions, as the first table 22 is cycled to successively deliver one or two bales to the forward end of the second table 26. Thus, the tie spikes 422 may be raised from their initial retracted position to their elevated position upon delivery of the first pair of bales in the initial step of forming the center rail tie tier pattern of bales.

Figure 38:
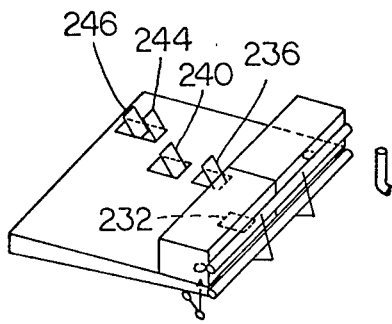
FIGS. 38 to 43 are perspective representations of the initial steps in the formation of bales into the center rail tie tier pattern of FIG. 26.
Figure 47:
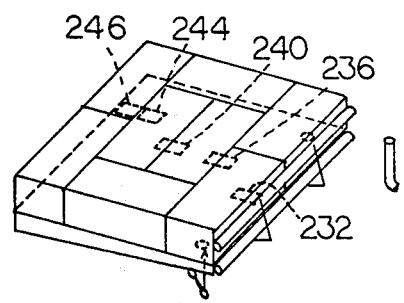
Figure 48:
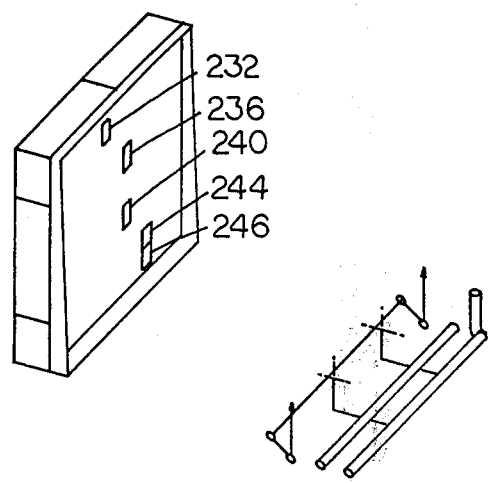

FIGS. 38 through 48 schematically illustrate the steps involved in the formation of bales into the center rail tie tier pattern of FIG. 26, beginning with the initial delivery of a row of bales onto the forward end of the second table, as shown in FIG. 38, and ending with delivery of the completed tier to the load bed, as depicted in FIG. 48.

Figure 39:
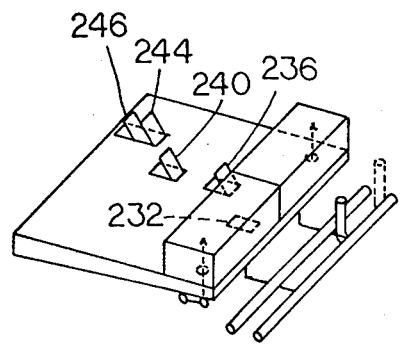

As just mentioned, initial cycling of the first table to deliver the first pair of bales, as shown in FIG. 38, raises the tie spikes, being represented by the pair of arrows in FIG. 39, such that they penetrate the bales adjacent their respective outer ends. However, since initially the first sensor paddle 232 is active and is depressed by the right one of the pair of initially delivered bales, it causes the second table actuating mechanism 334 (FIGS. 9, 10, 17 through 20) to shift the second table valve spool 374 to its rearward position and thereby cause activation of the second table pivotal cycle toward its upper position. Lifting of the second table releases the trip member 462 of the tie spike control means 432 which causes shifting of the spike valve spool 456 to its rearward position and thereby retraction of the tie spikes.

Figure 40:
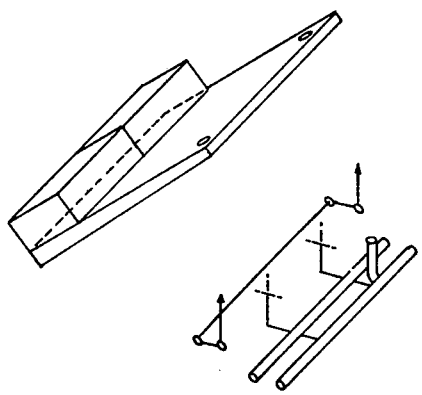

As the second table pivots upwardly, it soon reaches an angle of incline at which the first pair of bales slide to the rear end of the second table, as seen in FIG. 40.

Figure 41:
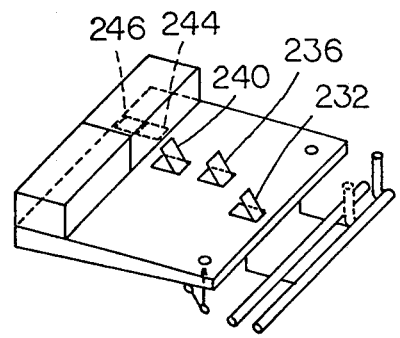
Figure 42:
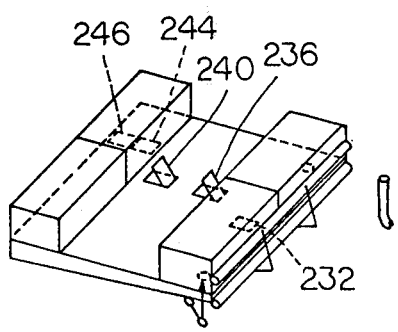
Figure 43:
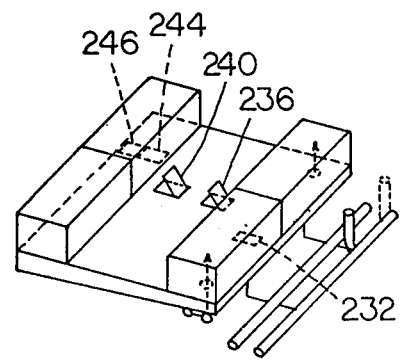
Figure 44:
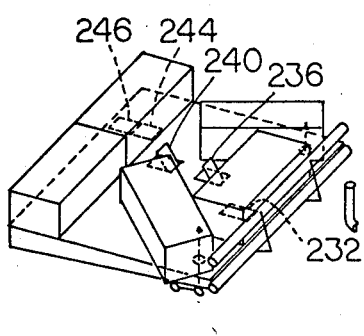
FIGS. 44 to 48 are perspective schematic representations of the remaining steps in the formation of bales into the center rail tie tier pattern of FIG. 26.
Figure 45:
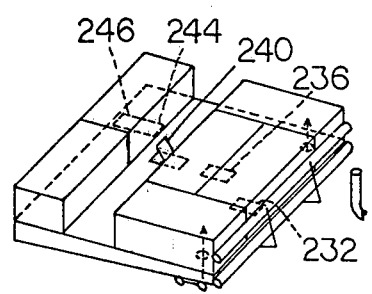
Figure 46:
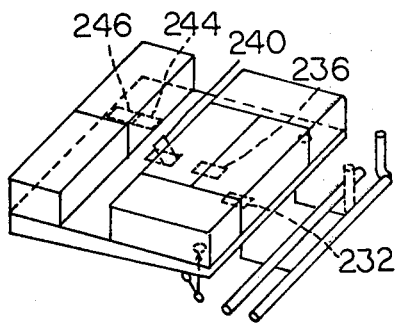

It will be recalled that as soon as the right bale of the pair slides away from the first sensor paddle 232, if it was not for the latch 346 (FIG. 17), which maintains the paddle 232 in its depressed condition until the bales reach the rear end of the second table and depress the interconnected fourth and fifth paddles 244, 246, the second table would prematurely fall and the bales would never reach the desired rear position. Once the bales reach and depress the interconnected fourth and fifth sensor paddles 244, 246, the first link 260 is lowered by the deactivation cam 316 and the third link 264 is allowed to assume the elevated position which deactivates the first sensor paddle 232 and activates the third sensor paddle 240, with the lowering of the first link 260 allowing the second table trip mechanism 336 (FIGS. 9, 17 through 20) to return to its initial position due to the spring return bias on the first and second pivotal assembly 354, 368 of the second table actuating mechanism 334 (FIG. 10) and thereby shift the second table valve spool 374 back to its forward position and cause the second table to return back to its lower position, as seen in FIG. 41.

The next several steps in the third mode of operation of the tier-forming means, as illustrated in FIGS. 42 through 45, are identical to those described hereinabove with respect to the second mode of operation of such means, as illustrated in FIGS. 27 through 30, with one exception, that being, that the second sensor paddle 236 is not active and thus its depression does not cause pivotal cycling of the second table. The depression of the paddle 236 only causes the tie spike valve spool 456 (FIG. 22) to shift to its rearward position and thereby retraction of the tie spikes and the single bale trip arm.

A final pair of bales is delivered to the second table and pushes the group of four bales rearward, as shown in FIG. 47, with the rearmost center bale of the group being pushed onto the third sensor paddle 240. Since the third paddle 240 had been previously rendered active by the deactivation cam 316, at the same time the first paddle 232 was deactivated, its depression causes the second table actuating mechanism 334 (FIGS. 9, 10 and 17 through 20) to shift the second table valve spool 374 to its rearward position and thereby cause actuation of the second table pivotal cycle toward its upper position. Since, the third paddle 240 remains depressed until the second table reaches its uper position, as seen in FIG. 48, the second table return trip 384 causes the second table actuating mechanism 334 to shift the second table valve spool 374 back to its forward position and thereby cause the second table to return back to its lower position. Also, the initial lifting of the second table released the trip member 462 of the tie spike control means 432 and caused retraction of the tie spikes.

In reviewing the above-described three modes of operation of the tier-forming means, it will be apparent that in the formation of bales into the standard tier pattern, only the interconnected fourth and fifth sensor paddles 244, 246 play a role, while in the formation of bales into the double rail tie tier pattern, only the second sensor paddle 236 plays a role. However, in the formation of bales into the center rail tie tier pattern, all of the sensor paddles play a role.

SELECTION OF FIRST TABLE MODE OF OPERATION

A final improved feature of the bale wagon 10 relates to means for selecting either the first or second of the two modes of operation for the first table 22 in response to movement of the load bed 52 or to movement of the second table 26.

As was stated hereinabove, the preferred form of such first table mode-selecting means is provided by mechanical trips and linkages, being operatively associated with the load bed 52 and the second table 26, for causing movement of the first table selector valve spool 104 to either its out or in positions.

The first table mode-selecting means is illustrated in FIGS. 8, 15, 21 and 22 and includes the first table selector valve 102 being mounted on a support plate 502 fixed to the right longitudinal rail 14.

Figures 14, 15:
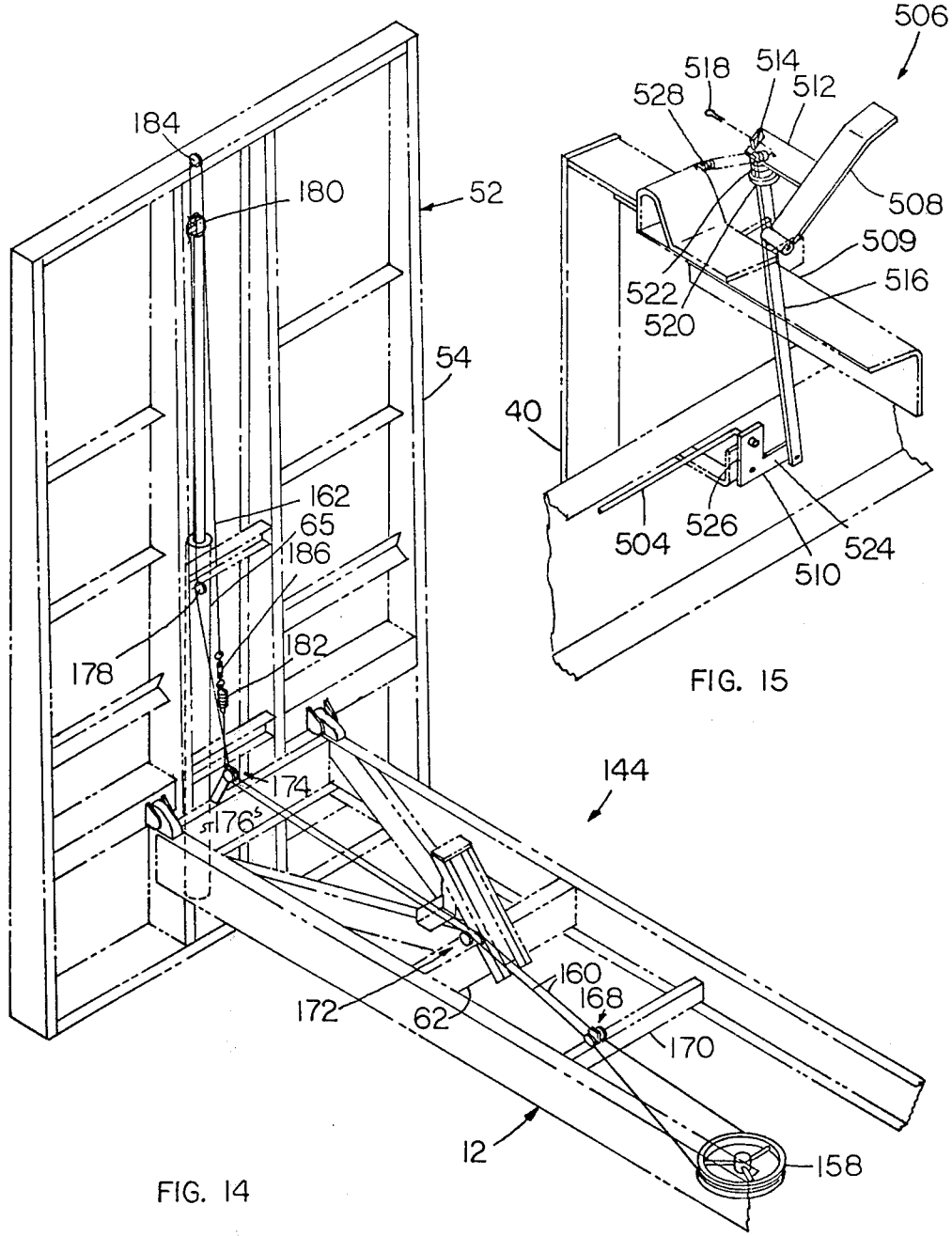
FIG. 14 is an enlarged perspective view of the load bed in its upright position, showing the rolling rack hydraulic cylinder, the cable drum and the route of a pair of interconnected cables, being connected to the piston end of the rolling rack hydraulic cylinder and extending about the cable drum.
FIG. 15 is an enlarged, fragmentary perspective view of a trip mechanism actuated by raising of the load bed of the bale wagon for shifting a selector valve for the first table.

The mode-selecting means further includes a first actuating rod 504 and a trip mechanism, generally designated as 506 in FIG. 15, being mounted to the right longitudinal rail 14 under the load bed 52, with the rod 504 extending from the trip mechanism 506 to adjacent the rear end of the selector valve spool 104, as seen in FIGS. 21 and 22.

The trip mechanism 506 includes an upper arm 508 pivotally mounted to the upper portion of an upstanding brace means 509 fixed to the rail 14 and a lower angled plated 510 pivotally mounted to the rail 14. The upper pivotal arm 508 includes a laterally-extending tab 512 with a slot 514 formed through its outer end portion. The upper end of a connecting link 516 is received through the slot 514 and held therethrough by a cotter key 518 fitted through a hole in the link 516 at location adjacent the upper side of the tab 512. A washer 520 is fixed to the link 516 at a location spaced through a short distance below the cotter key location and a spring 522 extends about the link 516 between the washer 520 and the underside of the tab 512. The lower end of the link 516 is pivotally secured to a rearwardly-extending leg 524 of the lower angled plate 510 and the rear end of the first actuating rod 504 is pivotally secured to an upwardly-extending front leg 526 of the lower angled plate 510. A spring 528 is connected from the tab 512 forwardly to the upper portion of the brace means 509.

When the load bed 52 is disposed in its lower position of FIG. 1, its underside rests on, and downwardly depresses, the upper pivotal arm 508 which causes downward movement of connecting link 516 through compression of spring 522 against the washer 520 fixed to the link 516. Downward movement of the link 516 causes the lower angled plate 510 to pivot rearwardly and clockwise, as viewed in FIG. 15, which pulls the actuating rod 504 rearward such that its forward end is spaced rearwardly of the rear end of the selector valve spool 104, as seen in FIGS. 21 and 22.

Lifting of the load bed 52 allows the upper pivotal arm 508 to pivot upwardly and counterclockwise, as viewed in FIG. 15, due to the pull of spring 528 on the tab 512 when the arm 508 is released by the load bed. Such pivotal movement of upper arm 508 upwardly lifts the connecting link 516 which pivots the lower plate counterclockwise, as viewed in FIG. 15, and pushes the actuating rod 504 in a forward direction through a sufficient distance for the front end of the rod 504 to engage the rear end of the selector valve spool 104 and push it to its forward or out position. As stated hereinbefore, when the spool 104 is at its out position, the first table 22 is thereby selected or allowed to operate in the first of its two modes in which it will deliver bales to the second table on their edge sides.

Referring now to FIGS. 21 and 22, the mode-selecting means also includes a second actuating rod 530 and the second pivotal assembly 436 of the tie spike control means 432. The rod 530 is pivotally secured at its forward end to the second pivotal assembly 436 at the lower end of the trip member leg portion 466 and the upper ends of vertical members 470, 472. The rod 530 extends rearwardly to adjacent the front end of the selector valve spool 104.

Pivotal movement of second pivotal assembly 436 from its dotted line position to its solid line position, as seen in FIG. 22, when the second table 26 is lifted upwardly off the trip member 462 of the assembly 436, causes the second actuating rod 530 to be pushed in a rearward direction through a sufficient distance for the rear end of the rod 530 to engage the front end of the selector valve spool 104 and push it to its rearward or in position. As stated hereinbefore, when the spool 104 is at its in position, the first table 22 is thereby selected or allowed to operate in the second of its two modes in which it will deliver bales to the second table on their flat sides.

When the second table 26 is returned to its lower position, the trip member 462 is depressed, causing the second pivotal assembly 436 to pivotally move from its solid line position to its broken line position, as seen in FIG. 22, which pulls the second actuating rod 530 in a forward direction such that its rearward end is spaced forwardly of the front end of the selector valve spool 104.

With respect to the four stack patterns, stored on the storage cam 142, it has been mentioned that one difference between the position A, B and C stack patterns is in the side orientation of the bales in their first and second tiers. In this respect, the position D stack pattern is identical to the position A stack pattern. Further, the tiers of all the stack patterns above the first two lowermost tiers are composed of bales having identical side orientations, that being, bales resting on their flat sides on the second table and when the stacks have been uprighted on the ground.

Figure 49:
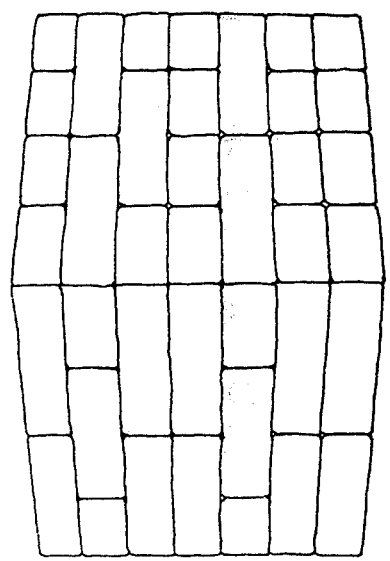
FIGS. 49 to 51 are perspective views of alternative patterns of standing block-type stacks which may be formed on the bale wagon of FIG. 1 through use of the storage cam of FIG. 11.

In the position A stack pattern of FIG. 49 (and also the position D stack pattern of FIG. 51), bales in both of the first and second tiers rest on their flat sides on the second table and when the stack has been uprighted on the ground. Therefore, in preparing for formation of the first tier of the position A stack pattern (or the position D stack pattern) on the bale wagon 10, if the first table selector valve spool 104 is disposed at its out position due to the pivotal lifting of the load bed 52 to unload the stack previously formed on the wagon 10, the second table 26 must be lifted approximately 10 inches to shift the selector valve spool 104 to its in position, and then lowered, so that the first table 22 will commence operation in its second mode for delivering bales on their flat sides onto the second table 26. Then, once the first or lowermost tier has been formed on the second table 26 and transferred to the load bed 52 by pivotally lifting the second table 26, the selector valve spool 104 will remain at its in position, whereby the first table 22 will again commence operation in its second mode. The same will be true for the remaining five tiers of the position A stack pattern (or the remaining seven tiers of the position D stack pattern).

In the preferred, position B stack pattern of FIG. 2, bales in the first tier rest on their edge sides on the second table and when the stack has been uprighted on the ground, and in the second tier rest on their flat sides on the second table and when the stack has been uprighted on the ground. Normally, due to the pivotal lifting of the load bed 52 to unload the stack previously formed on the bale wagon 10, the first table selector valve spool 104 will be initially disposed at its out position. If such is the case, then the first table 22 will commence operation in its first mode for delivering bales on their edge sides onto the second table 26, as desired. However, if the spool 104 should happen to be disposed at its in position, for example, because the second table 26 had previously been lifted when empty in order to make adjustments to the wagon mechanisms, the load bed 52 must be lifted approximately 10 inches to shift the selector valve spool 104 to its out position, and then lowered, so that the first table 22 will commence operation in its first mode. Then, once the first or lowermost tier has been formed on the second table 26 and transferred to the load bed 52 by pivotally lifting the second table 26, the selector valve spool 104 will now be shifted to its in position, whereby the first table 22 will commence operation in its second mode for delivering bales on their flat sides to the second table 26 during formation of the second tier on the second table 26. The same will be true for the remaining 5 (or 6) tiers of the position B stack pattern.

Figure 50:
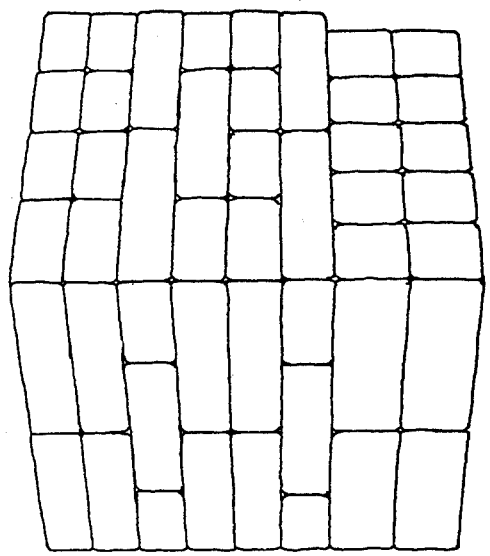
Figure 51:
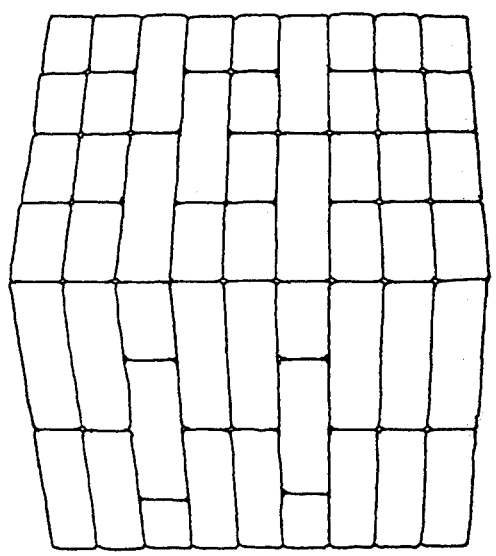

In the position C stack pattern of FIG. 50, bales in the first and second tiers rest on their edge sides on the second table and when the stack has been uprighted on the ground. With respect to formation of the first or lowermost tier of the position C stack pattern, the same possibilities as to the initial position of the selector valve spool 104 and procedures for shifting the spool 104 apply as outlined above in connection with the position B stack pattern. With respect to formation of the second tier of the position C stack pattern, since transfer of the previously formed first tier to the load bed 52 necessitated lifting of the second table 26, the selector valve spool 104 will be disposed at its in position. Therefore, prior to commencement of operations for forming the second tier, the load bed 52 now having the first tier disposed thereon must be lifted approximately 10 inches to shift the spool 104 to its out position, and then lowered, so that the first table 22 will again commence operation in its first mode. Then, once the second tier has been formed on the second table 26 and transferred to the load bed 52 by pivotally lifting the second table 26, the spool 104 will be shifted to its in position, whereby the first table 22 will commence operation in its second mode for delivering bales on their flat sides to the second table 26 during formation of the third tier on the second table 26. The same will be true for the remaining five tiers of the position C stack pattern.

It is thought that the improved bale wagon of the present invention and many of its attendant advantages will be understood from the foregoing description and it will be apparent that various changes may be made in the form, construction and arrangement of the parts of the bale wagon described without departing from the spirit and scope of the invention of sacrificing all of its material advantages, the form hereinbefore described being merely a preferred or exemplary embodiment thereof.

Having thus described the invention, what is claimed is:

1. In a bale wagon having means for accumulating bales and being movable between bale accumulating and non-accumulating positions and means for successively delivering a predetermined number of bales in a predetermined arrangement to said bale-accumulating means when it is at its accumulating position for forming a first tier pattern of bales, the improvement which comprises:

at least one element arranged on said bale-accumulating means for sensing bale presence at a predetermined location on said means;

first means disposed in a first, inoperative position and movable between said first position and a second, operative position for rearranging some of said bales on said bale-accumulating means;

second means actuatable between a first, inoperative condition and a second, operative condition for moving said bale-accumulating means between its positions, said first means and second means, when in their respective operative position and condition, being capable of coordinated operation in at least one mode for forming successively-delivered bales into a second tier pattern;

means for selecting an inoperative mode, or said operative mode, for said first means and second means to thereby respectively select said firsts tier pattern or said second tier pattern;

means coupled with said selecting means for controlling the position of said first means according to the mode selected by said selecting means, said control means maintaining said first means in its first position upon selection of said inoperative mode and allowing movement of said first means between its positions during its coordinated operation with said second means in said operative mode; and means coupled with said element, said means being activated by said selecting means upon selection of said operative mode to render said second means responsive to said one element and thereby actuated to its operative condition for moving said bale-accumulating means between its said positions when said one element senses the presence of a bale, said means being deactivated by said selecting means upon selection of said inoperative mode to render said second means non-responsive to said one element.

2. A bale wagon as recited in claim 1, wherein:

said bale-delivering means is disposed in a first position for successively receiving bales and movable between said first position and a second position for successively delivering said bales to said bale-accumulating means; and said control means includes first actuatable means operatively associated with said bale-delivering means and responsive to its movement from its first position to its second position for allowing said first means to move from its first, inoperative position to its second, operative position during coordinated operations of said first means and second means in said operative mode, and second actuatable means operatively associated with said bale-accumulating means and responsive to its movement from its bale accumulating position to its non-accumulating position for causing said first means to move from its second, operative position to its first, inoperative position during coordinated operations of said first means and second means in said operative mode.

3. A bale wagon as recited in claim 2, wherein:

said bale-accumulating means has an opening formed therein at said predetermined location on said means; and said paddle extends through said opening in said means.

4. A bale wagon as recited in claim 1, wherein said element comprises a paddle mounted to said bale-accumulating means and normally extending from said means, said paddle being movable to a depressed position upon being engaged by a bale.

5. In a bale wagon having means for accumulating bales and being movable between bale accumulating and non-accumulating positions and a plurality of operable means associated with said bale-accumulating means for delivering bales thereto and arranging bales into a plurality of different tier patterns, the improvement which comprises:

means associated with said bale-accumulating means for sensing bale presence at any of a predetermined number of locations;

means for selecting at which of said locations bale presence will be sensed by said sensing means; and actuatable means for moving said bale-accumulating means between its said positions, said actuatable means capable of being rendered responsive to said sensing means by said selecting means such that, when at least a predetermined one of said locations has been selected for sensing bale presence and upon the presence of a bale being sensed at said location prior to completion of the delivering and arranging of bales into at least one of said plurality of different tier patterns by some of said plurality of operable means, said actuatable means responds to said sensing means to cause said bale-accumulating means to move between its said positons for facilitating further delivering and arranging of bales by said some of said plurality of operable means to complete said one of said different tier patterns.

6. A bale wagon as recited in claim 5, wherein said selecting means includes:

means movable between a plurality of different positions each respectively representing a different one of said plurality of tier patterns; and means associated with said movable means and associated with said bale presence sensing means at each of said predetermined locations, said associated means being activated by said movable means, upon disposition thereof at each of said different positions, for selecting different ones of said locations by connecting said bale presence sensing means at said selected locations to said actuatable means such that said actuatable means will cause said bale-accumulating means to move between its said positions upon the sensing of bale presence at least at said predetermined one of said selected locations.

7. A bale wagon as recited in claim 6, further comprising:

a memory element having successive positions defined thereon for storing a predetermined sequence of said plurality of tier patterns, each of said positions representing one of said tier patterns;

means movably coupled to said movable means of said selecting means and associated with said memory element, said coupled and associated means responsive to each of said memory element positions to cause said movable means of said selecting means to become disposed at one of its positions; and means for successively disposing said coupled and associated means at each of said memory element positions.

8. A bale wagon as recited in claim 5, wherein said selecting means includes:
a memory element having successive positions defined thereon for storing a predetermined sequence of said plurality of tier patterns, each of said positions representing one of said tier patterns; and
means associated with said memory element and associated with said bale presence sensing means at each of said predetermined locations, said associated means being activated upon disposition thereof at each of said memory element positions for selecting different ones of said locations by connecting said bale presence sensing means at said selected locations to said actuatable means such that said actuatable means will cause said bale-accumulating means to move between its said positions upon the sensing of bale presence at least at said predetermined one of said selected locations.

9. A bale wagon as recited in claim 5, wherein said bale presence sensing means comprises a plurality of paddles respectively mounted to said bale-accumulating means at said plurality of predetermined locations, said paddles normally extending from said bale-accumulating means and each being movable to a depressed position upon being engaged by a bale to thereby sense bale presence at a respective one of said locations.

10. A bale wagon as recited in claim 9, wherein:
said bale-accumulating means has a plurality of openings formed therein respectively at said predetermined locations thereon; and
said paddles extend through said respective openings.

11. A bale wagon as recited in claim 9, wherein said selecting means includes:
a plurality of links coupled with said respective paddles; and
a cam movable between different positions for providing connection between respective ones of said links and said actuatable means to thereby select which one of said paddles said actuatable means will be responsive to when said one of said paddles are engaged and depressed by a bale.

12. In a bale wagon having means for accumulating bales and being movable between bale accumulating and non-accumulating positions and a plurality of operable means associated with said bale-accumulating means for delivering bales thereto and arranging bales into a plurality of different tier patterns, the improvement which comprises:
means associated with said bale-accumulating means for sensing bale presence at any of a predetermined number of locations;
means for selecting at which of said locations bale presence will be sensed by said sensing means, said selecting means being movable between a plurality of different positions each respectively representing a different one of said plurality of tier patterns;
actuatable means for moving said bale-accumulating means between its said positions, said actuatable means capable of being rendered responsive to said sensing means by said selecting means such that, when at least a predetermined one of said locations has been selected for sensing bale presence and upon the presence of a bale being sensed at said location prior to completion of the delivering and arranging of bales into at least one of said plurality of different tier patterns by some of said plurality of operable means, said actuatable means responds to said sensing means to cause said bale-accumulating means to move between its said positions for facilitating further delivering and arranging of bales by said some of said plurality of operable means to complete said one of said different tier patterns;
means for storing a predetermined sequence of said plurality of tier patterns, said means defining a plurality of successively-displaced positions which each represent one of said tier patterns;
means movably coupled to said selecting means and associated with said storing means, said coupled and associated means responsive to each of said storing means positions to cause said selecting means to become disposed at one of its positions; and
means for successively disposing said coupled and associated means at each of said storing means positions.

13. In a bale wagon having means for accumulating bales and being movable between bale accumulating and non-accumulating positions and operable means associated with said bale-accumulating means for delivering bales thereto and arranging bales into at least one tie tier pattern, the improvement which comprises:
means associated with said bale-accumulating means for sensing bale presence at least at one predetermined location on said means;
means for selecting when bale presence will be sensed by said sensing means; and
actuatable means for moving said bale-accumulating means between its said positions, said actuatable means capable of being rendered responsive to said sensing means by said selecting means such that, when said at least one predetermined location has been selected for sensing bale presence and upon the presence of a bale being sensed at said location prior to completion of the delivering and arranging of bales into said at least one tie tier pattern by said operable means, said actuatable means responds to said sensing means to cause said bale-accumulating means to move between its said positions for facilitating further delivering and arranging of bales by said operable means to complete said tie tier pattern.

14. A bale wagon as recited in claim 13, wherein said selecting means includes:
means movable to at least one position which respectively represents said at least one tie tier pattern; and
means associated with said movable means and associated with said bale presence sensing means, said associated means being activated by said movable means, upon disposition thereof at said at least one position, for selecting said at least one location for sensing bale presence by connecting said bale presence sensing means to said actuatable means such that said actuatable means will cause said bale-accumulating means to move between its said positions upon the sensing of bale presence at said at least one location.

15. A bale wagon as recited in claim 13, wherein said bale presence sensing means comprises a paddle mounted to said bale-accumulating means at said at least one predetermined location, said paddle normally extending from said bale-accumulating means and being movable to a depressed position upon being engaged by a bale to thereby sense bale presence at said location.

16. A bale wagon as recited in claim 15, wherein:

said bale-accumulating means has an opening formed therein at said at least one predetermined location; and said paddle extends through said opening.

17. A bale wagon as recited in claim 15, wherein said selecting means includes:

a link coupled with said paddle; and a cam movable to a position for providing connection between said link and said actuatable means to thereby render said actuatable means responsive to said paddle when engaged and depressed by a bale.

* * * * *